US012704838B2

(12) United States Patent
Segal et al.

(10) Patent No.: US 12,704,838 B2
(45) Date of Patent: Aug. 11, 2026

(54) GESTURE-CONTROLLED ROBOTIC FEEDBACK

(71) Applicant: COLORADO SCHOOL OF MINES, Golden, CO (US)

(72) Inventors: Avigal Denise Segal, Evergreen, CO (US); Andrew Jacob Petruska, Golden, CO (US); Anne Katherine Silverman, Golden, CO (US)

(73) Assignee: Colorado School of Mines, Golden, CO (US)

( * ) Notice: Subject to any disclaimer, the term of this patent is extended or adjusted under 35 U.S.C. 154(b) by 393 days.

(21) Appl. No.: 17/868,466

(22) Filed: Jul. 19, 2022

(65) Prior Publication Data

US 2023/0037237 A1 Feb. 2, 2023

Related U.S. Application Data

(60) Provisional application No. 63/223,469, filed on Jul. 19, 2021.

(51) Int. Cl.
*G05D 1/00* (2024.01)

(52) U.S. Cl.
CPC ......... *G05D 1/0016* (2013.01); *G05D 1/0033* (2013.01)

(58) Field of Classification Search
CPC .......................... G05D 1/0016; G05D 1/0033
See application file for complete search history.

(56) References Cited

U.S. PATENT DOCUMENTS 10,981,279 B2 * 4/2021 Hayashi ................. B25J 13/087
11,117,047 B2 * 9/2021 Lin ....................... A63F 13/213
12,005,981 B2 * 6/2024 Doerksen ................ B62D 9/02
2017/0160793 A1 * 6/2017 Perlin ..................... G06F 3/011
2022/0291679 A1 * 9/2022 Kimura ................ G05D 1/0033
2023/0037237 A1 * 2/2023 Segal .................. G05D 1/0033
2023/0123518 A1 * 4/2023 Sharma ............. G06Q 30/0601 345/632

FOREIGN PATENT DOCUMENTS

WO WO-2020221311 A1 * 11/2020 ............ B25J 13/006

OTHER PUBLICATIONS

Segal et al., iRebot: An Interactive Rehabilitation Robot with Gesture Control, 2020 IEEE (Year: 2020).*
Fitzgerald et al., A Virtual Rehabilitation System for Wobble Board Balance Training with Children, 2008 IEEE (Year: 2008).*

(Continued)

*Primary Examiner* — Thomas Ingram
(74) *Attorney, Agent, or Firm* — Dorsey & Whitney LLP

(57) ABSTRACT

In one embodiment, a method of providing an intervention, includes: obtaining a motion sensing device configured for manipulation by a user; creating, via one or more processing elements, a communication link between the motion sensing device and a robot; and detecting, via the motion sensing device, a movement initiated by the user; creating, via the one or more processing elements, a signal within the sensing device; transmitting, via the one or more processing elements, the signal to the robot; and moving the robot based on the signal.

20 Claims, 15 Drawing Sheets

(56) References Cited

OTHER PUBLICATIONS

M. T. Wolf, C. Assad, M. T. Vernacchia, J. Fromm and H. L. Jethani, "Gesture-based robot control with variable autonomy from the JPL BioSleeve," 2013 IEEE International Conference on Robotics and Automation, Karlsruhe, Germany, 2013 (Year: 2013).*
Sathiyanarayanan, Mithileysh, et al. "Gesture controlled robot for military purpose." International journal of technological research in Engineering 1 (2014): 1300-1303. (Year: 2014).*
Balasubramanian, S.; Colombo, R.; Sterpi, I.; Sanguineti, V.; Burdet, E. Robotic assessment of upper limb motor function after stroke. Am. J. Phys. Med. Rehabil. 2012, 91, S255-S269.
Balasubramanian, S.; Melendez-Calderon, A.; Burdet, E. A robust and sensitive metric for quantifying movement smoothness. IEEE Trans. Biomed. Eng. 2012, 59, 2126-2136.
Barlett, N.D.; Gentile, D.A.; Barlett, C.P.; Eisenmann, J.C.; Walsh, D.A. Sleep as a mediator of screen time effects on US children's health outcomes: A prospective study. J. Child. Media 2012, 6, 37-50.
Birkenmeier, R.L.; Prager, E.M.; Lang, C.E. Translating animal doses of task-specific training to people with chronic stroke in 1-hour therapy sessions: A proof-of-concept study. Neurorehabil. Neural Rep. 2010, 24, 620-635.
Borsci, S.; Federici, S.; Lauriola, M. On the dimensionality of the System Usability Scale: A test of alternative measurement models. Cog. Process. 2009, 10, 193-197.
Brewer, B.R.; McDowell, S.K.; Worthen-Chaudhari, L.C. Poststroke upper extremity rehabilitation: A review of robotic systems and clinical results. Top. Stroke Rehabil. 2007, 14, 22-44.
Broeks, J.G.; Lankhorst, G.J.; Rumping, K .; Prevo, A.J.H. The long-term outcome of arm function after stroke: Results of a follow-up study. Disabil. Rehabil. 1999, 21, 357-364.
Brooke, J. Sus: A Quick and Dirty usability scale. Usability Eval. Ind. 1996, 189, 4-7.
Brooke, J. Sus: A Retrospective. J. Usability Stud. 2013, 8, 29-40.
Brutsch, K.; Koenig, A.; Zimmerli, L.; Merillat-Koeneke, S.; Riener, R.; Jancke, L.; van Hedel, H.J.A.; Meyer-Heim, A. Virtual reality for enhancement of robot-assisted gait training in children with neurological gait disorders. J. Rehabil. Med. 2011, 43, 493-499.
Charles, S.K.; Hogan, N. The curvature and variability of wrist and arm movements. Exp. Brain Res. 2010, 203, 63-73.
Chen, Y.; Duff, M.; Lehrer, N.; Sundaram, H.; He, J.; Wolf, S.L.; Rikakis, T. A computational framework for quantitative evaluation of movement during rehabilitation. AIP Conf. Proc. Am. Inst. Phys 2011, 1371, 317-326.
Colombo, R.; Pisano, F.; Micera, S.; Mazzone, A.; Delconte, C.; Carrozza, M.C.; Dario, P.; Minuco, G. Robotic techniques for upper limb evaluation and rehabilitation of stroke patients. IEEE Trans. Neural Sys. Rehabil. Eng. 2005, 13, 311-324.
Duncan, P.W.; Horner, R.D.; Reker, D.M.; Samsa, G.P.; Hoenig, H.; Hamilton, B.; LaClair, B.J .; Dudley, T.K. Adherence to postacute rehabilitation guidelines is associated with functional recovery in stroke. Stroke 2002, 33, 167-78.
Feys, H.M.; De Weerdt, W.J.; Selz, B.E.; Cox Steck, G.A.; Spichiger, R.; Vereeck, L.E.; Putman, K.D.; Van Hoydonck, G.A. Effect of a therapeutic intervention for the hemiplegic upper limb in the acute phase after stroke: A single-blind, randomized, controlled multicenter trial. Stroke 1998, 29, 785-792.
Flash, T.; Hogan, N. The coordination of arm movements: An experimentally confirmed mathematical model. J. Neurosci. 1985, 5, 1688-1703.
Graves, L.E.; Ridgers, N.D.; Williams, K.; Stratton, G.; Atkinson, G.; Cable, N.T. The physiological cost and enjoyment of Wii Fit in adolescents, young adults, and older adults. J. Phys. Act. Health 2010, 7, 393-401.
Guadagnoli, M.A.; Lee, T.D. Challenge point: A framework for conceptualizing the effects of various practice conditions in motor learning. J. Mot. Behav. 2004, 36, 212-224.
Koch, Andreas, et al. "The neurophysiology and treatment of motion sickness." Deutsches Ärzteblatt International 115.41 (2018): 687.
Lang, C.E.; MacDonald, J.R.; Reisman, D.S.; Boyd, L.; Kimberley, T.J.; Schindler-Ivens, S.M.; Hornby, T.G.; Ross, S. .; Scheets, P.L. Observation of amounts of movement practice provided during stroke rehabilitation. Arch. Phys. Med. Rehabil. 2009, 90, 1692-1698.
Levin, M.F.; Weiss, P.L.; Keshner, E.A. Emergence of virtual reality as a tool for upper limb rehabilitation: Incorporation of motor control and motor learning principles. Phys. Ther. 2015, 95, 415-425.
Lewis, J.R.; Sauro, J. The factor structure of the System Usability Scale. In International Conference on Human Centered Design; Human Centered Design. HCD 2009. Lecture Notes in Computer Science; Kurosu, M.; Eds .; Springer: Berlin/Heidelberg, Germany, 2009; vol. 5619, pp. 94-103.
Likert, R. A technique for the measurement of attitudes. Arch. Psychol. 1932, 140, 1-55.
Lissak, G. Adverse physiological and psychological effects of screen time on children and adolescents: Literature review and case study. Environ. Res. 2018, 164, 149-157.
Lohse, K.; Shirzad, N.; Verster, A.; Hodges, N.; Van der Loos, M. Video games and rehabilitation: Using design principles to enhance engagement in physical therapy. J. Neurol. Phys. Ther. 2013, 37, 166-175.
Manwell, Laurie A., et al. "Digital dementia in the internet generation: excessive screen time during brain development will increase the risk of Alzheimer's disease and related dementias in adulthood." Journal of Integrative Neuroscience 21.1 (2022): 28.
Martinho, D., Carneiro, J., Corchado, J. M., & Marreiros, G. (2020). A systematic review of gamification techniques applied to elderly care. Artificial Intelligence Review, 53(7), 4863-4901. https://doi.org/10.1007/s10462-020-09809-6.
McLaughlin, A.; Gandy, M.; Allaire, J.; Whitlock, L. Putting fun into video games for older adults. Ergon. Des. 2012, 20, 13-22.
Nemec, D.; Janota, A.; Gregor, M.; Hrubos, M.; Pirnik, R. Control of the mobile robot by hand movement measured by inertial sensors. Electr. Eng. 2017, 99, 1161-1168.
Neophytou, Eliana, Laurie A. Manwell, and Roelof Eikelboom. "Effects of excessive screen time on neurodevelopment, learning, memory, mental health, and neurodegeneration: A scoping review." International Journal of Mental Health and Addiction 19.3 (2021): 724-744.
Patel, K.; Bailenson, J.N.; Hack-Jung, S.; Diankov, R.; Bajcsy, R. The effects of fully immersive virtual reality on the learning of physical tasks. In Proceedings of the 9th Annual International Workshop on Presence, Cleveland, OH, USA, Aug. 24-26, 2006; pp. 87-94.
Paulich, M.; Schepers, M.; Rudigkeit, N.; Bellusci, G. Xsens MTw Awinda: Miniature Wireless Inertial-Magnetic Motion Tracker for Highly Accurate 3D Kinematic Applications; Xsens: Enschede, The Netherlands, 2018; pp. 1-9.
Pomeroy, V.; Aglioti, S.M.; Mark, V.W.; McFarland, D.; Stinear, C.; Wolf, S.L.; Corbetta, M.; Fitzpatrick, S.M. Neurological principles and rehabilitation of action disorders: Rehabilitation interventions. Neurorehabil. Neural Repair 2011, 25, 33S-43S.
Prahm, C.; Kayali, F.; Vujaklija, I.; Sturma, A.; Aszmann, O. Increasing motivation, effort and performance through game-based rehabilitation for upper limb myoelectric prosthesis control. In Proceedings of the 2017 International Conference on Virtual Rehabilitation (ICVR), Montreal, QC, Canada, Jun. 19-22, 2017; pp. 1-6.
Renewal Lodge.com. Available online: https://www.renewallodge.com/5-ways-quitting-drinking-affects-your-brain/ (accessed on Jun. 21, 2020).
Rodgers, J.L.; Nicewander, W.A. Thirteen ways to look at the correlation coefficient. Am. Stat. 1988, 42, 59-66.
Sathiyanarayanan, M.; Azharuddin, S.; Kumar, S.; Khan, G. Gesture controlled robot for military Purpose. Int. J. Technol. Res. Eng. 2014, 1, 1300-1303.
Schmeäl, Frank. "Neuronal mechanisms and the treatment of motion sickness." Pharmacology 91.3-4 (2013): 229-241.
Segal, A.D. et al., Sensors, 2020. 20(4269): 1-18.

(56) References Cited

OTHER PUBLICATIONS

Segal, A.D.; Lesak, M.C.; Suttora, N.E.; Silverman, A.K.; Petruska, A.J. iRebot: An interactive rehabilitation robot with gesture control. In Proceedings of the IEEE International Conference Engineering in Medicine and Biology Society (EMBC), Montreal, QC, Canada, Jul. 20-24, 2020; pp. 1-4.
Semprini, M.; Laffranchi, M.; Sanguineti, V.; Avanzino, L.; De Icco, R.; De Michieli, L.; Chiappalone, M. Technological approaches for neurorehabilitation: From robotic devices to brain stimulation and beyond. Front. Neurol. 2018, 9, 212.
Shaw, Lindsay Alexander, et al. "Challenges in virtual reality exergame design." (2015).
Sheppard, Amy L., and James S. Wolffsohn. "Digital eye strain: prevalence, measurement and amelioration." BMJ open ophthalmology 3.1 (2018): e000146.
Sigrist, R.; Rauter, G.; Riener, R.; Wolf, P. Augmented visual, auditory, haptic, and multimodal feedback in motor learning: A review. Psychon. Bull. Rev. 2013, 20, 21-53.
Sluijs, E.M.; Knibbe, J.J. Patient compliance with exercise: Different theoretical approaches to short-term and long-term compliance. Patient Educ. Couns. 1991, 17, 191-204.
Snoddy, G.S. Learning and stability: A psychophysiological analysis of a case of motor learning with clinical applications. J. App. Psyc. 1926, 10, 1.
Snodgrass, S.J.; Rivett, D.A.; Robertson, V.J.; Stojanovski, E. Real-time feedback improves accuracy of manually applied forces during cervical spine mobilisation. Man. Ther. 2010, 15, 19-25.
Standen, P.J.; Threapleton, K.; Connell, L.; Richardson, A.; Brown, D.J.; Battersby, S.; Sutton, C.J.; Platts, F. Patients' use of a home-based virtual reality system to provide rehabilitation of the upper limb following stroke. Phys. Ther. 2015, 95, 350-359.
Taylor, A.H.; May, S. Threat and coping appraisal as determinants of compliance with sports injury rehabilitation: An application of Protection Motivation Theory. J. Sport. Sci. 1996, 14, 471-482.
Taylor, R. Interpretation of the correlation coefficient: A basic review. J. Diagnos. Med. Sonogr. 1990, 6, 35-39.
Timmermans, A.A.; Seelen, H.A.; Willmann, R.D.; Kingma, H. Technology-assisted training of arm-hand skills in stroke: Concepts on reacquisition of motor control and therapist guidelines for rehabilitation technology design. J. Neuroeng. Rehabil. 2009, 6, 1-18.
Timmermans, A.A.A.; Seelen, H.A.M.; Geers, R.P.J.; Saini, P.K.; Winter, S.; te Vrugt, J.; Kingma, H. Sensor-based arm skill training in chronic stroke patients: Results on treatment outcome, patient motivation, stem usability. IEEE Trans. Neural. Sys. Rehabil. Eng. 2010, 18, 284-292.
Umejima, Keita, et al. "Paper notebooks vs. mobile devices: brain activation differences during memory retrieval." Frontiers in Behavioral Neuroscience (2021): 34.
Warraich, Z.; Kleim, J.A. Neural plasticity: The biological substrate for neurorehabilitation. PM&R 2010, 2, S208-S219.
Wen, R.; Tay, W.L.; Nguyen, B.P.; Chng, C.B.; Chui, C.K. Hand gesture guided robot-assisted surgery based on a direct augmented reality interface. Comp. Meth. Prog. Biomed. 2014, 116, 68-80.
Wolf, M.T.; Assad, C.; Vernacchia, M.T.; Fromm, J.; Jethani, H.L. Gesture-based robot control with variable autonomy from the JPL BioSleeve. In Proceedings of the 2013 IEEE International Conference on Robotics and Automation, Karlsruhe, Germany, May 6-10, 2013; pp. 1160-1165.
Wu, C.Y.; Chen, C.I.; Tang, S.F.; Lin, K.C.; Huang, Y.Y. Kinematic and clinical analyses of upper-extremity movements after constraint-induced movement therapy in patients with stroke: A randomized controlled trial. Arch. Phys. Med. Rehabil. 2007, 88, 964-970.
Wulf, G. Self-controlled practice enhances motor learning: Implications for physiotherapy. Physiotherapy 2007, 93, 96-101.
Yang, G.; Lv, H.; Chen, F.; Pang, Z.; Wang, J.; Yang, H.; Zhang, J. A novel gesture recognition system for intelligent interaction with a nursing-care assistant robot. Appl. Sci. 2018, 8, 2349.
Yue, Z.; Zhang, X.; Wang, J. Hand rehabilitation robotics on poststroke motor recovery. Behav. Neurol. 2017, 2017, 1-20.
Zhang, Li-Li, et al. "Motion sickness: current knowledge and recent advance." CNS neuroscience & therapeutics 22.1 (2016): 15-24.
Zollo, L.; Rossini, L.; Bravi, M.; Magrone, G.; Sterzi, S.; Guglielmelli, E. Quantitative evaluation of upper-limb motor control in robot-aided rehabilitation. Med. Biolog. Eng. Comp. 2011, 49, 1131-1144.
Gamecho, Borja , "A Context-Aware Application to Increase Elderly Users Compliance with Physical Rehabilitation Exercises at Home via Animatronic Biofeedback", Gamecho B, Silva H, Guerreiro J, Gardeazabal L, Abascal J. A context-aware application to increase elderly users compliance with physical rehabilitation exercises at home via animatronic biofeedback. J Med Syst. 2015;39(11):1-11., 2015, 1-11.
Geurts, Luc , "Digital games for physical therapy: fulfilling the need for calibration and adaptation", Luc Geurts et al. Digital games for physical therapy: fulfilling the need for calibration and adaptation. TEI '11. Association for Computing Machinery, New York, NY, USA, 117-124. https://doi.org/10.1145/1935701.1935725, Jan. 2011, 117-124.
Globe, Daniel J, "Using the Wii Fit as a tool for balance assessment and neurorehabilitation: the first half decade of "Wii-search."", Goble DJ, Cone BL, Fling BW. Using the Wii Fit as a tool for balance assessment and neurorehabilitation: the first half decade of "Wii-search". J Neuroeng Rehabil. Feb. 8, 2014;11:12. doi: 10.1186/1743-0003-11-12. PMID: 24507245; PMCID: PMC3922272., 2014, 9 pages.
Kappen, Dennis , "Older Adults' Physical Activity and Exergames: A Systematic Review", Kappen D. L., "Older Adults' Physical Activity and Exergames: A Systematic Review" Int J Human-Computer Interact. 2019;35(2):140-167, 2019, p. 140-167.
Kobeissi, Ahmad Hassan, "Development of a Hardware/Software System for Proprioception Exergaming", Kobeissi AH, Lanza G, Berta R, Bellotti F, De Gloria A. Development of a hardware/software system for proprioception exergaming. Int J Serious Games. 2018;5(2):87- 100., 2018, 87-100.
Kosse, Nienke , "Exergaming: Interactive balance training in healthy community-dwelling older adults", Kosse NM, Caljouw SR, Vuijk P-J, Lamoth CJC. Exergaming: Interactive balance training in healthy community-dwelling older adults. J Cyber Ther Rehabil. 2011;4(3):399-407, 2011, 399-407.
Lamoth, Claudine , "Exergaming for elderly: effects of different types of game feedback on performance of a balance task", Lamoth CJ, Alingh R, Caljouw SR. Exergaming for elderly: effects of different types of game feedback on performance of a balance task. Stud Health Technol Inform. 2012;181:103-7. PMID: 22954837., 2012, 103-7.
Martinho, Diogo , "A systematic review of gamification techniques applied to elderly care", Martinho, D., Carneiro, J., Corchado, J. M., & Marreiros, G. (2020). A systematic review of gamification techniques applied to elderly care. Artificial Intelligence Review, 53(7), 4863-4901. https://doi.org/10.1007/s10462-020-09809-6, Feb. 4, 2020, 4863-4901.
Ogaya, Shinya , "Effects of balance training using wobble boards in the elderly", Ogaya S, Ikezoe T, Soda N, Ichihashi N. Effects of balance training using wobble boards in the elderly. J Strength Cond Res. 2011;25(9):2616-2622, 2011, 2616-2622.
Tahmosybayat, Robin , "Movements of older adults during exergaming interventions that are associated with the Systems Framework for Postural Control: A systematic review", Tahmosybayat R, Baker K, Godfrey A, Caplan N, Barry G. Movements of older adults during exergaming interventions that are associated with the Systems Framework for Postural Control: A systematic review. Maturitas. 2018;111:90-99, Mar. 15, 2018, 90-99.
Fitzgerald D, Trakarnratanakul N, Smyth B, Caulfield B. Effects of a wobble board-based therapeutic exergaming system for balance training on dynamic postural stability and intrinsic motivation levels. J Orthop Sports Phys Ther. Jan. 2010;40(1): 11-9., Jan. 2010, 11-9.
Van Diest, Mike , "Exergaming for balance training of elderly: state of the art and future developments", Van Diest M, Lamoth CJC, Stegenga J, Verkerke GJ, Postema K. Exergaming for balance

(56) References Cited

OTHER PUBLICATIONS training of elderly: state of the art and future developments. J Neuroeng Rehabil. 2013;10:101., 2013, Article No. 101.

* cited by examiner

Motorized Car

Gesture Controller

Exhausting
1
2
3
4
5
Effortless
Dominant Hand
Nondominant Hand
Experienced
Novice
None

GESTURE-CONTROLLED ROBOTIC FEEDBACK

CROSS-REFERENCE TO RELATED APPLICATIONS

This application claims benefit of priority pursuant to 35 U.S.C. § 119(e) of U.S. provisional patent application No. 63/223,469 entitled "GESTURE-CONTROLLED ROBOTIC FEEDBACK," filed on Jul. 19, 2021, which is hereby incorporated by reference in its entirety.

GOVERNMENT LICENSE RIGHTS

This invention was made with Government support under Grant No. DGE-1646713 awarded by the National Science Foundation Graduate Research Fellowship Program. The Government has certain rights in the invention.

FIELD

The disclosed processes, methods, and systems are directed generally to control of a robot via detection of a user motion.

BACKGROUND

Physical therapy and rehabilitation often requires repetitive and coordinated movements for effective treatment, which is also contingent on patient compliance and motivation. Often, the monotony, intensity, and expense of physical therapy routines do not promote engagement.

What is needed is something that helps alleviate low adherence, insufficient intensity levels, and ineffective performance assessments associated with many existing physical therapy programs.

SUMMARY

In one embodiment a device includes: a processing unit; a communications unit; a movement detector in communication with the processing unit via the communications unit; and a robot, wherein the movement detector is configured to detect user motion and control the robot based on the motion, wherein the device is configured to be used for at least one of rehabilitation, training, recreation, or diagnosis of the user.

Optionally, in some embodiments, the movement detector comprises a wearable device.

Optionally, in some embodiments, the movement detector is coupled to an intervention device.

Optionally, in some embodiments, the intervention device comprises a wobble board, the wobble board configured to receive the feet of the user thereupon and receive the motion based on a balance of the user.

Optionally, in some embodiments, the robot comprises at least one of a tele-operated vehicle or an at least partially autonomous vehicle.

Optionally, in some embodiments, the device further includes a course configured to receive the vehicle, wherein the control of the vehicle is configured to guide the vehicle through the course.

In one embodiment, a method of providing an intervention, includes: obtaining a motion sensing device configured for manipulation by a user; creating, via one or more processing elements, a communication link between the motion sensing device and a robot; and detecting, via the motion sensing device, a movement initiated by the user; creating, via the one or more processing elements, a signal within the sensing device; transmitting, via the one or more processing elements, the signal to the robot; moving the robot based on the signal.

Optionally, in some embodiments, the motion sensing device comprises a wearable device.

Optionally, in some embodiments, the motion sensing device is coupled to an intervention device.

Optionally, in some embodiments, the intervention device comprises a wobble board, the wobble board configured to receive the feet of the user thereupon and receive the motion based on a balance of the user.

Optionally, in some embodiments, the robot comprises at least one of a tele-operated vehicle or an at least partially autonomous vehicle.

Optionally, in some embodiments, the motion of the vehicle is configured to guide the vehicle through a course.

Optionally, in some embodiments, the method further includes: generating, via the motion sensing device, a signal operative to control the robot based on a user motion; moving the robot in response to receiving the signal; generates a visual feedback signal based on the motion of the robot; and generating an updated signal, via the motion sensing device, based on an updated user motion and the visual feedback signal.

In one embodiment a system includes a motion sensing device; a robot; and a central processing unit in electronic communication with at least one of the motion sensing device or the robot, wherein the system is configured to be used for at least one of rehabilitation, training, recreation, or diagnosis of a user.

Optionally, in some embodiments, the system includes a closed loop control system; the motion sensing device generates a signal operative to control the robot based on a user motion; the robot moves in response to receiving the signal; and the motion of the robot generates a visual feedback signal; the motion sensing device generates an updated signal based on an updated user motion, the updated user motion based on the visual feedback signal.

Optionally, in some embodiments, the motion sensing device comprises a wearable device.

Optionally, in some embodiments, the motion sensing device is coupled to an intervention device.

Optionally, in some embodiments, the intervention device comprises a wobble board, the wobble board configured to receive the feet of the user thereupon and receive the motion based on balance of the user.

Optionally, in some embodiments, the robot comprises at least one of a tele-operated vehicle or an at least partially autonomous vehicle.

Optionally, in some embodiments, the system further includes a course configured to receive the vehicle, wherein motion sensing device detects a user input and generates a signal configured to control of the vehicle to guide the vehicle through the course.

Hand-eye coordinated movements close the control loop, providing feedback to the system through changes in wrist pitch and roll (*brain image courtesy of [31]).

Figure 4:
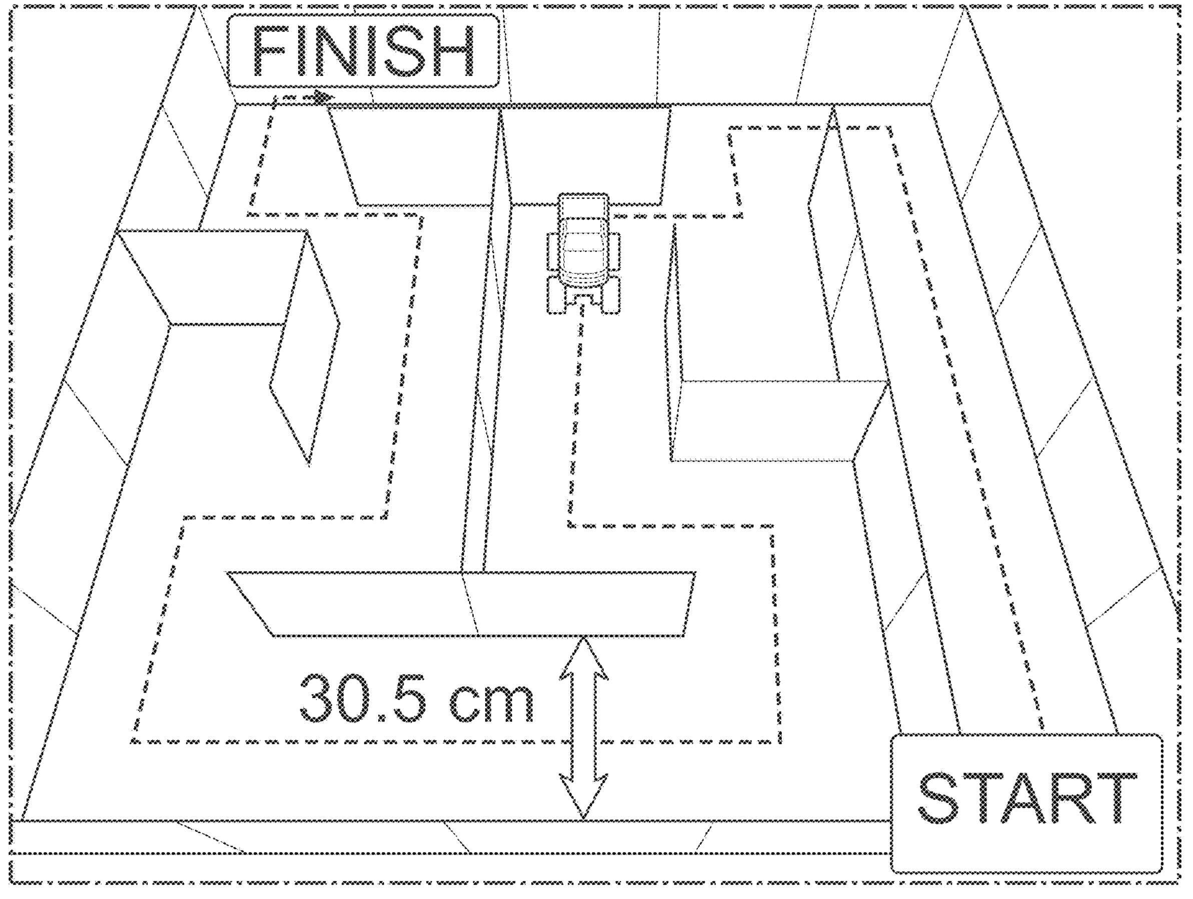

FIG. 4 shows the maze executed by all participants was completed in the same direction (start to finish) for each trial. The blue line along the maze pathway (wall width=30.5 cm; dowel protrusion=0.75 cm each) depicts the nominal route, consisting of 14 straight segments and 13 total 90 degree turns (6 left, 7 right).

Figure 5:
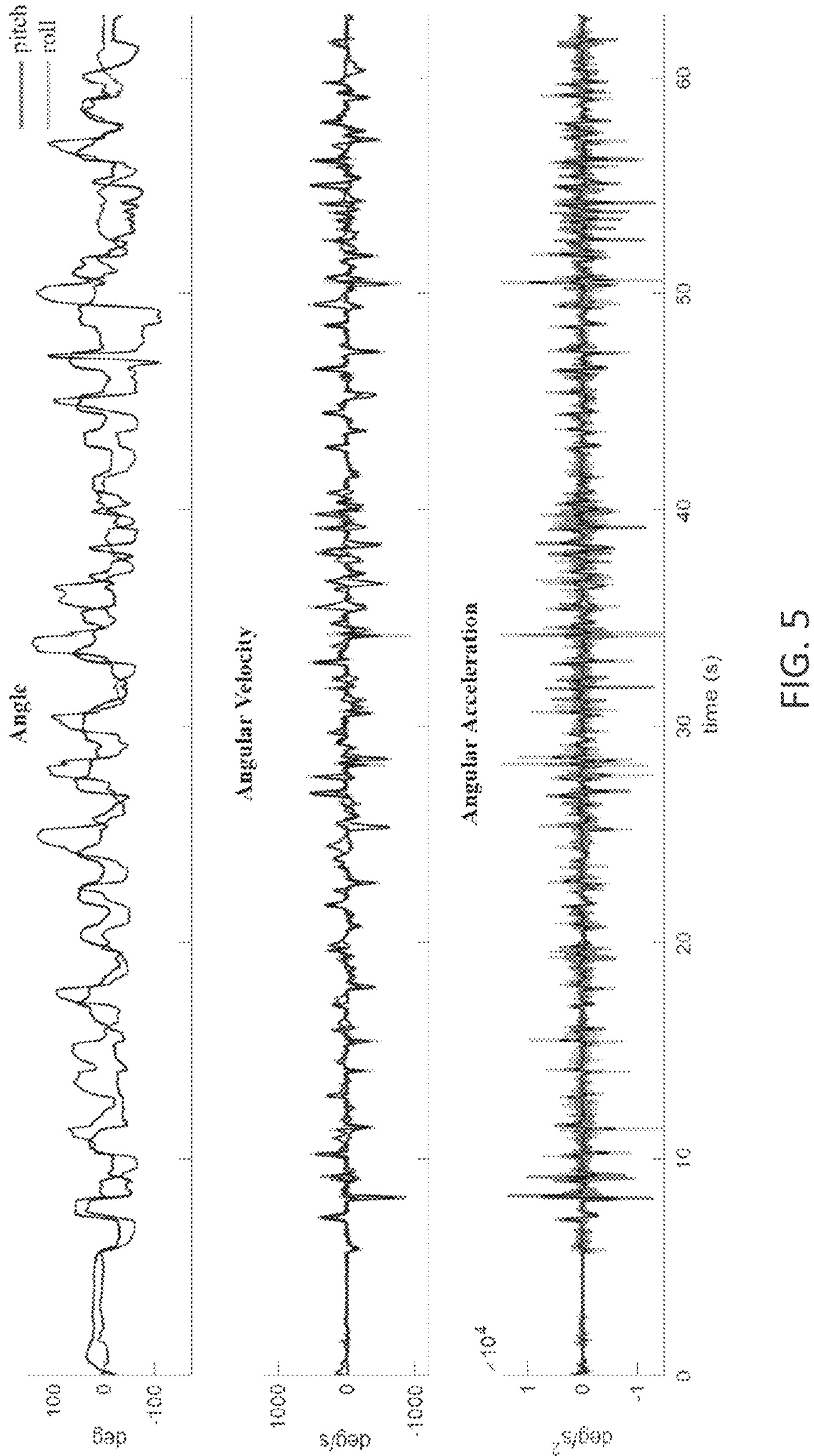

FIG. 5 shows XSens IMU filtered (black) and unfiltered pitch (magenta) and roll (blue) angle, angular velocity, and angular acceleration signals versus time for a single trial.

Figure 6:
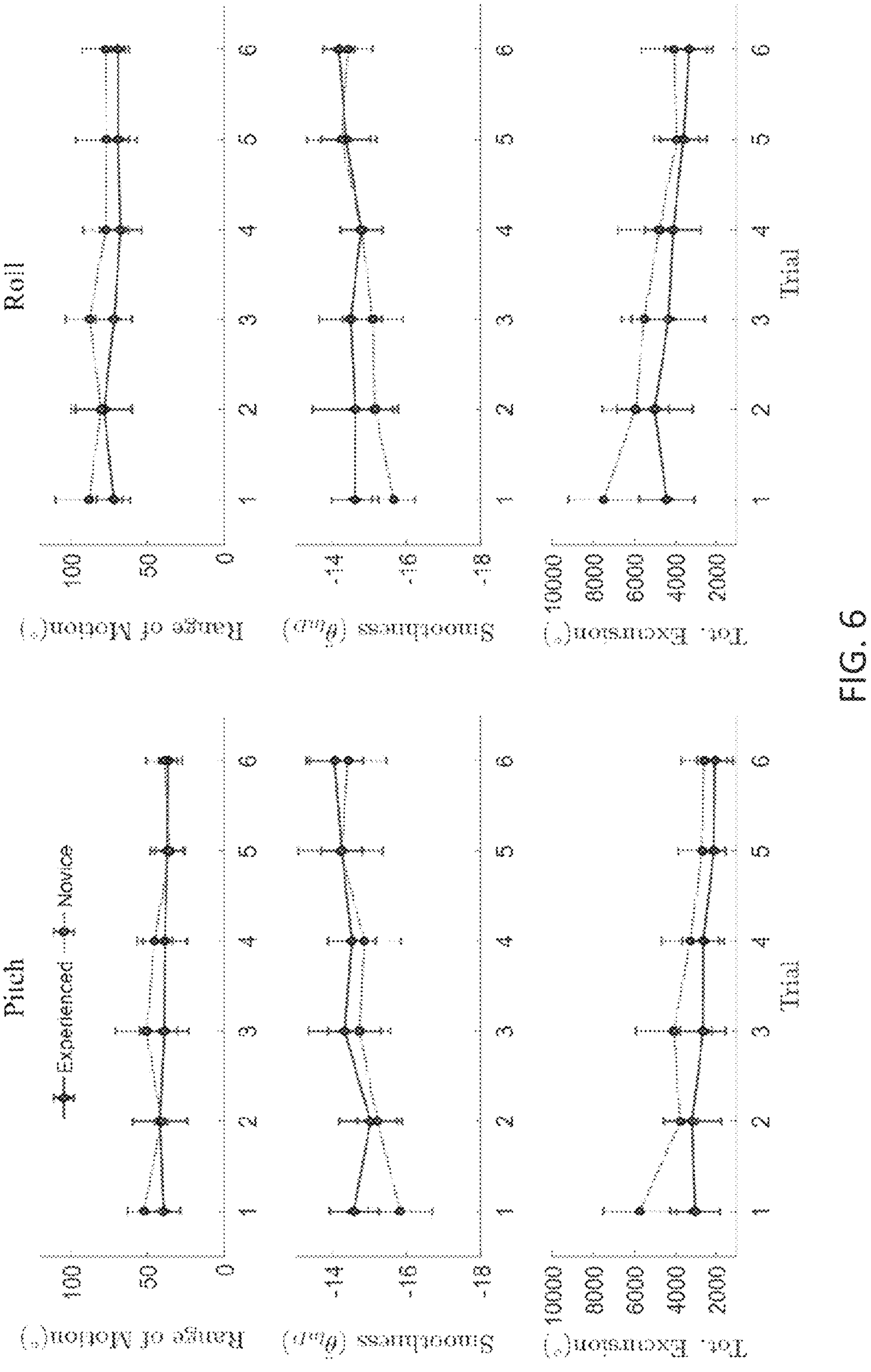

FIG. 6 shows mean±SD quality of movement IMU-based metrics across six repeated trials including pitch and roll active range of motion (°), smoothness ($\theta''_{inD}$), and total angular excursion (Tot. Excursion: $\theta_{Tot}$(°)) separated by video-game experience (experienced, novice).

Figure 7:
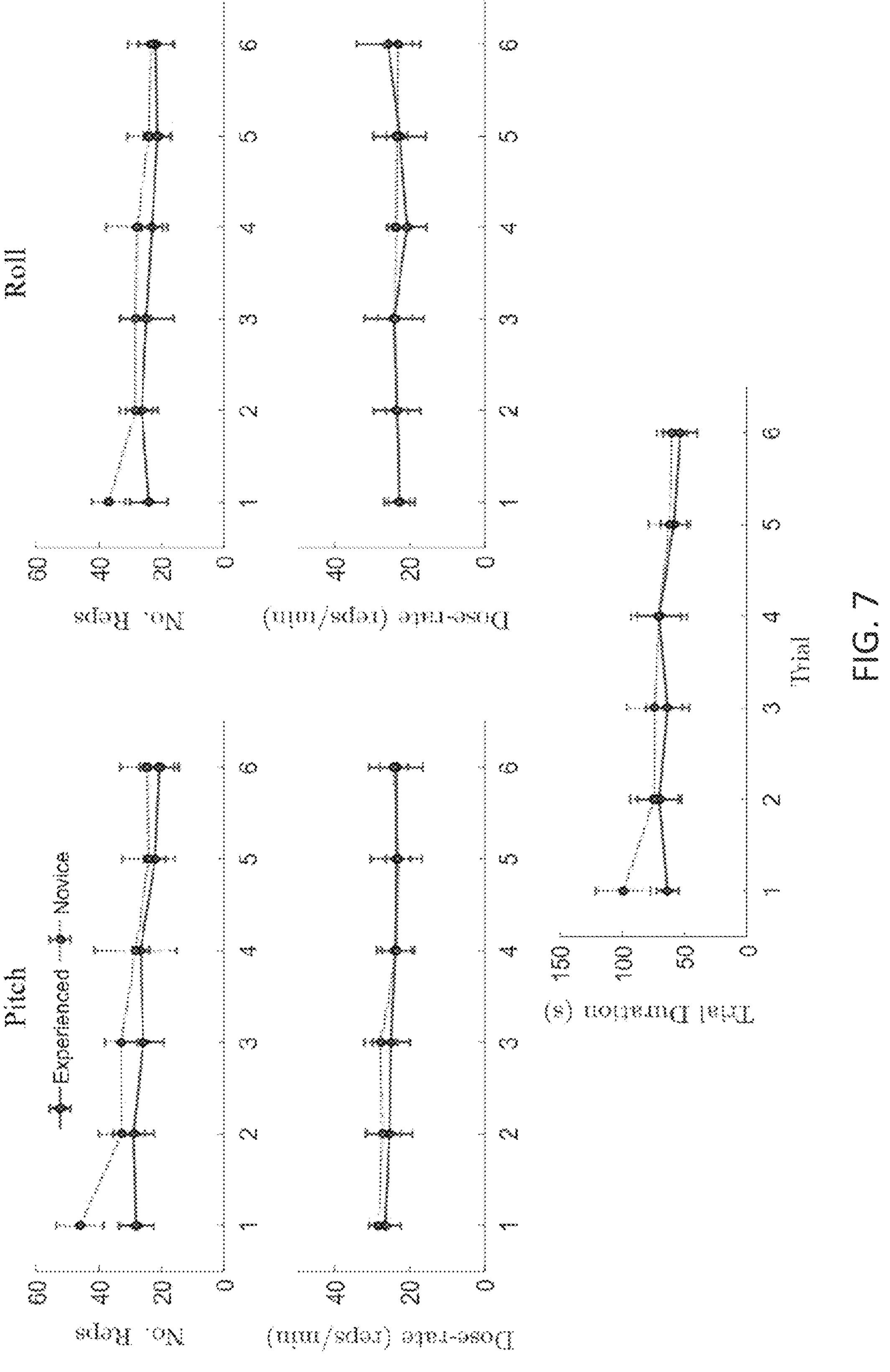

FIG. 7 shows mean±SD quantity of movement IMU-based metrics across six repeated trials including pitch and roll number of repetitions (No. Reps), dose-rate (reps/min), and trial duration (s), separated by video-game experience (experienced, novice).

Figure 8:
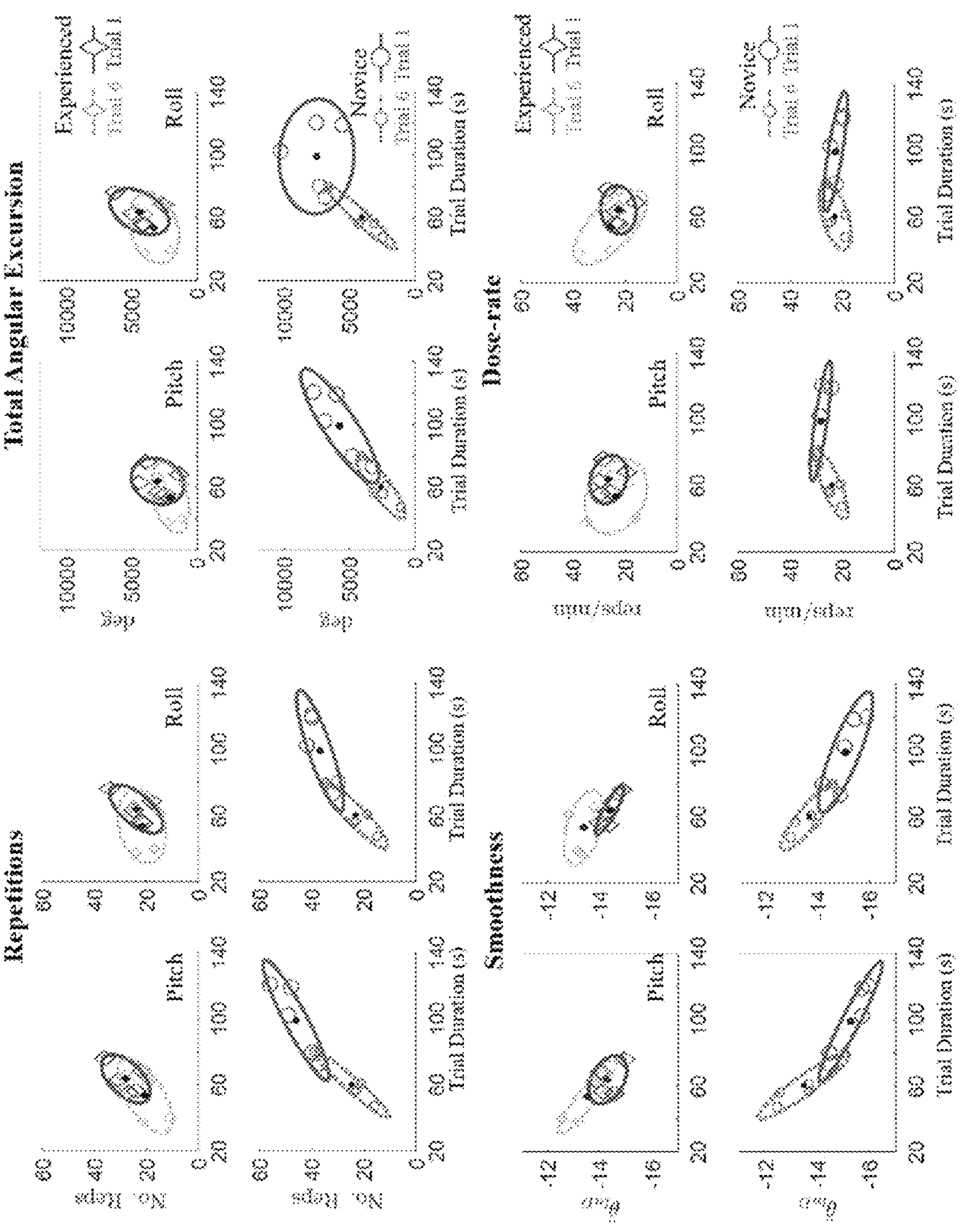

FIG. 8 shows motor learning differences of experienced and novice participant groups. Motor performance metrics including the number of repetitions (No. Reps), total angular excursion (Tot. Excursion: $\theta_{Tot}$(°)), smoothness ($\theta''_{InD}$), and dose-rate (reps/min) for pitch and roll motions are plotted versus trial duration (s) for the first (Trial 1) and last (Trial 6) trials. Individual participant performance (diamond and circle markers) and sample-distribution ellipses (75% confidence intervals) are also shown.

Figure 9:
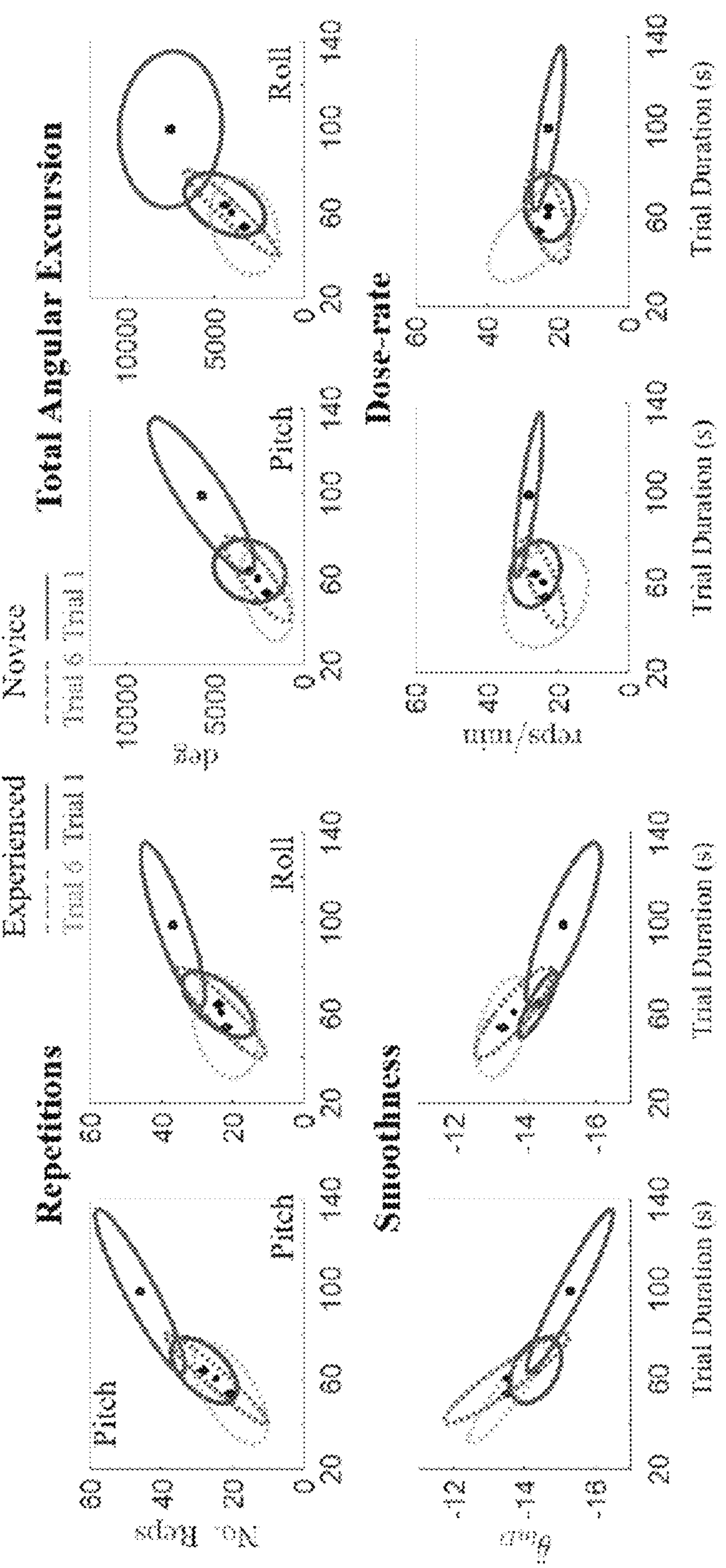

FIG. 9 shows Sample-distribution ellipses (75% confidence intervals) for novice and experienced participants from FIG. 8 are overlaid to demonstrate the convergence of the participant groups' motor performance by Trial 6, based on the overlapping sample-distribution ellipses.

Figure 10:
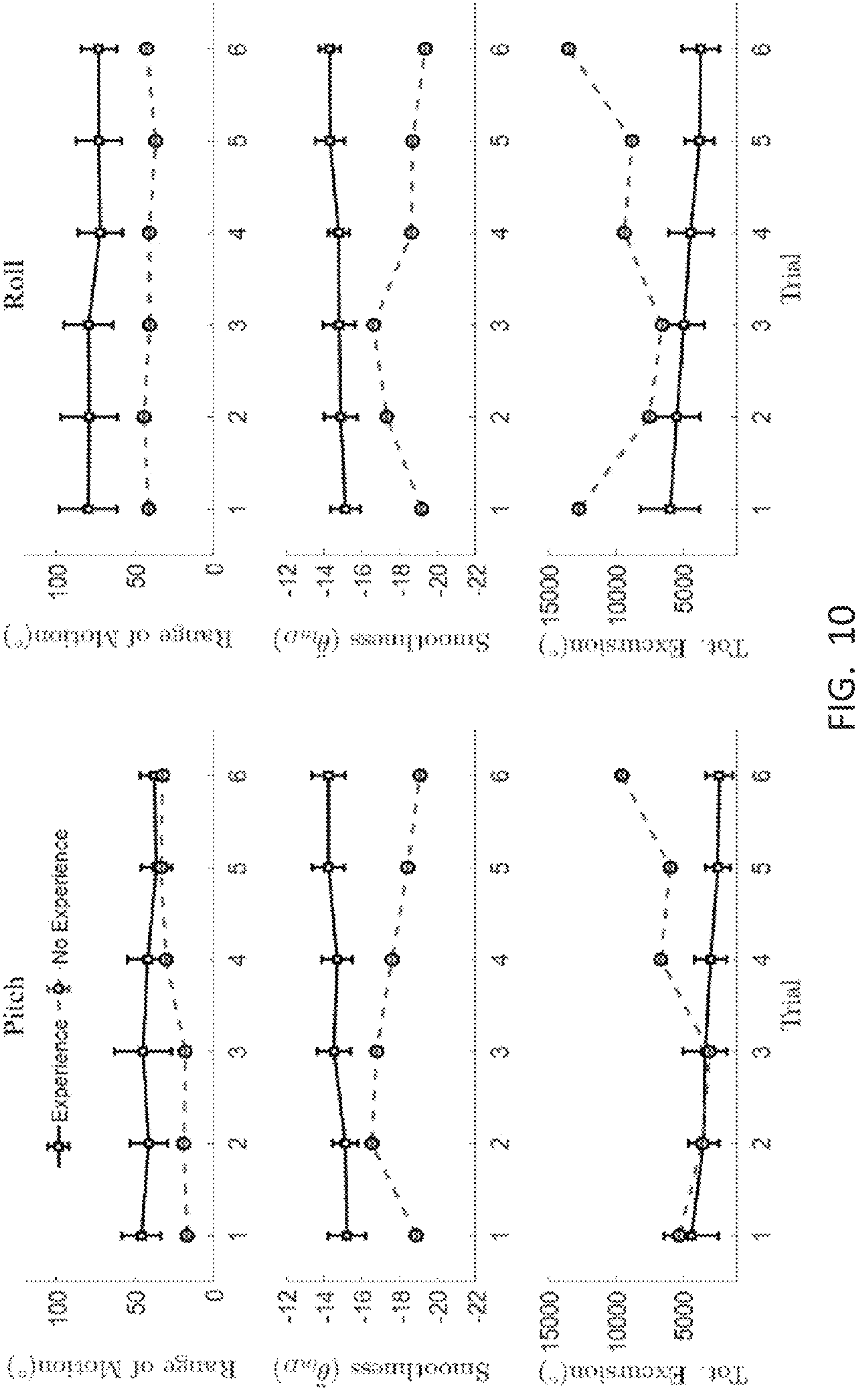

FIG. 10 shows quality of movement metrics across six repeated trials for a single participant with no video-game experience compared to the mean SD across the participants with video-game experience.

Figure 11:
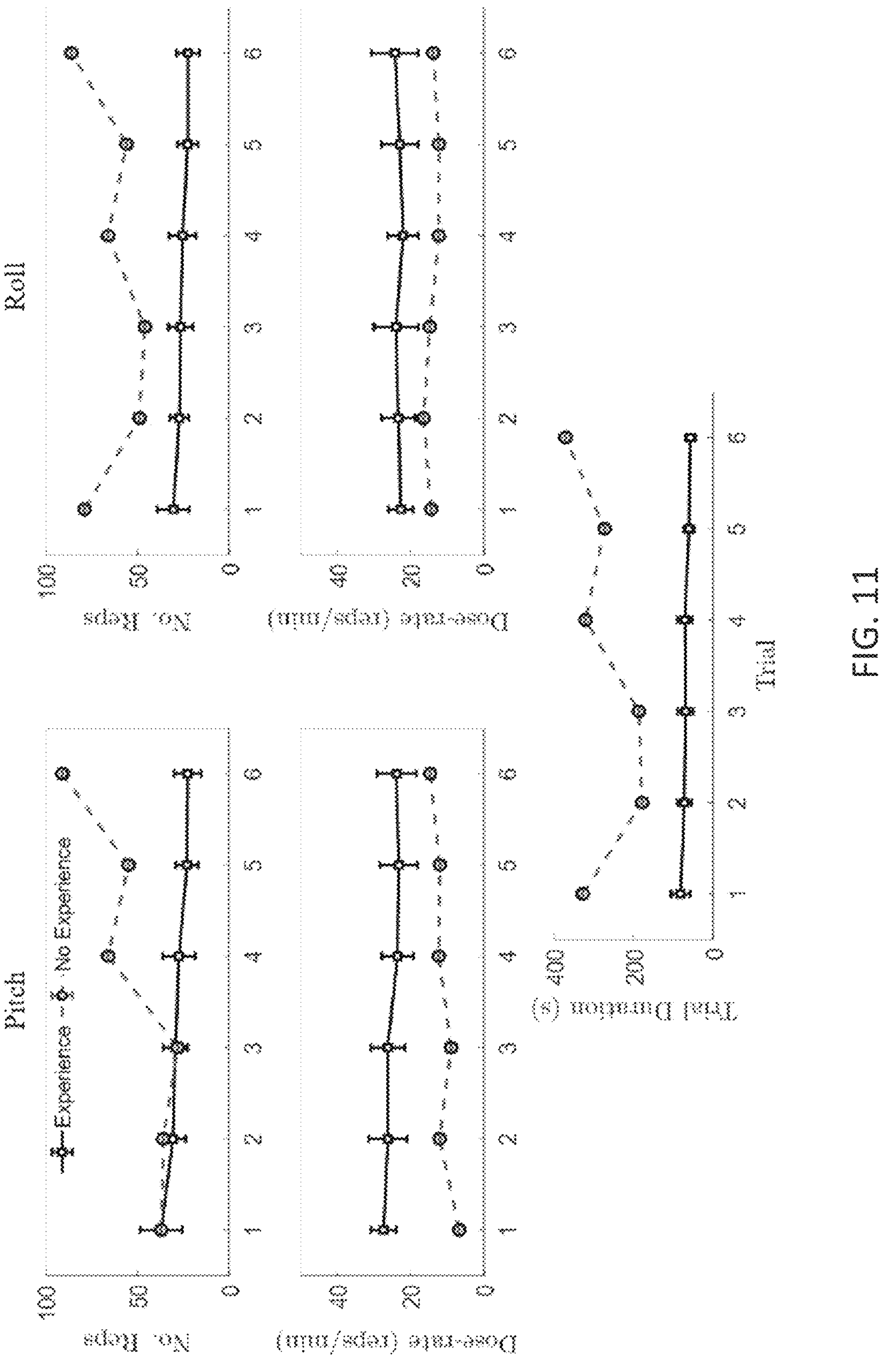

FIG. 11 shows quantity of movement metrics across six repeated trials for a single participant with no video-game experience compared to the mean SD across the participants with video-game experience.

Figure 12:
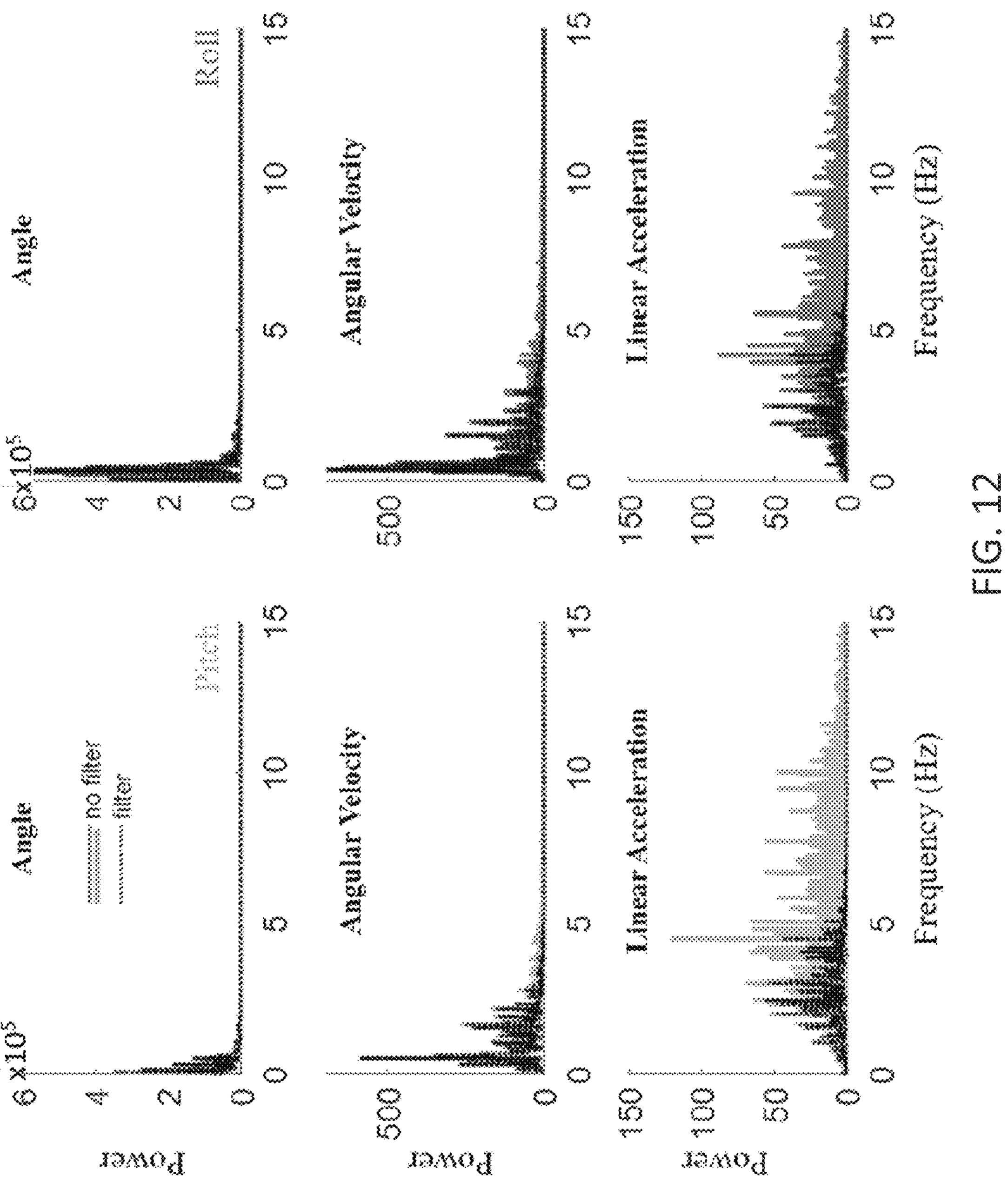

FIG. 12 shows Fast Fourier transforms (FFT) comparing filtered and unfiltered Xsens IMU signals demonstrate that a slower sampling rate would likely be sufficient for the angle and angular velocity-based metrics because the frequency contents are below the low pass filter 5 Hz cutoff.

Figures 13, 14:
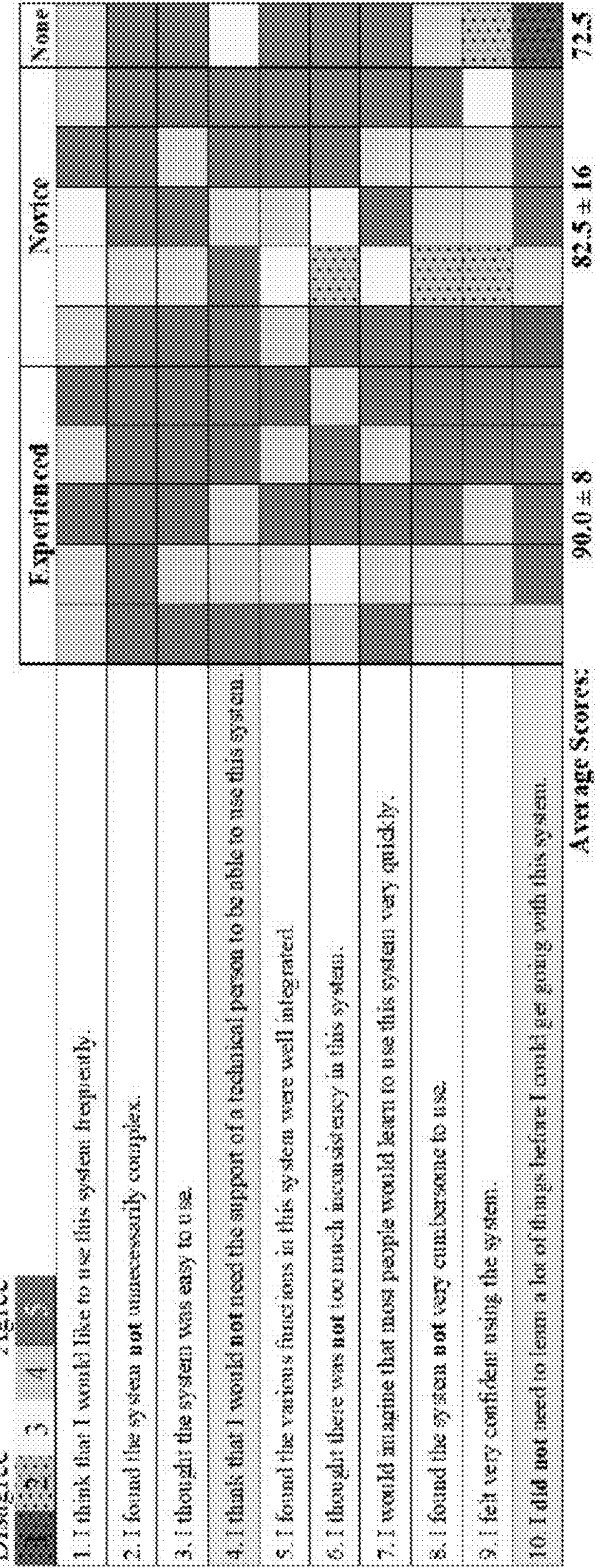

FIG. 13 presents usability survey scores for one embodiment of the disclosed systems and methods separated by participant (n=11). Average scores are separated by video-game experience (experienced, novice, none). The survey items highlighted in gray are specifically associated with learnability. The survey statements were converted to the positive direction (changes in bold font) to be consistent with scoring and facilitate the interpretation of the FIG.

FIG. 14 presents effort scores for one embodiment of the disclosed systems and methods separated by participant (n=11), hand dominance, and video-game experience (experienced, novice, none). The participant without video-game experience found the task to be exhausting.

Figure 15:
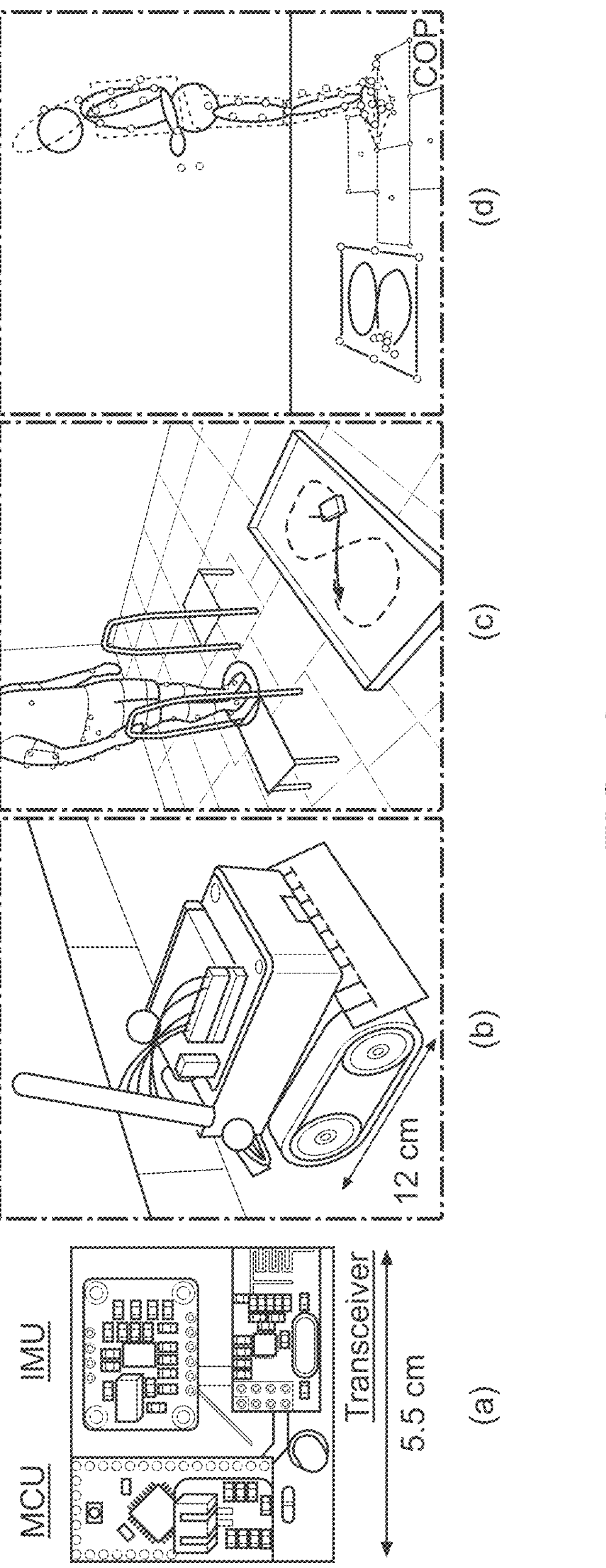

FIG. 15 shows various aspects of one embodiment of the disclosed systems and methods; Panel A is IMU-based gesture controller; Panel B shows a telerobot; Panel C shows robot car trajectory (top-down view) of a maze trial (upper) and experimental setup (lower); Panel D shows a three dimensional model of a user using a system of the present disclosure.

Figure 16:
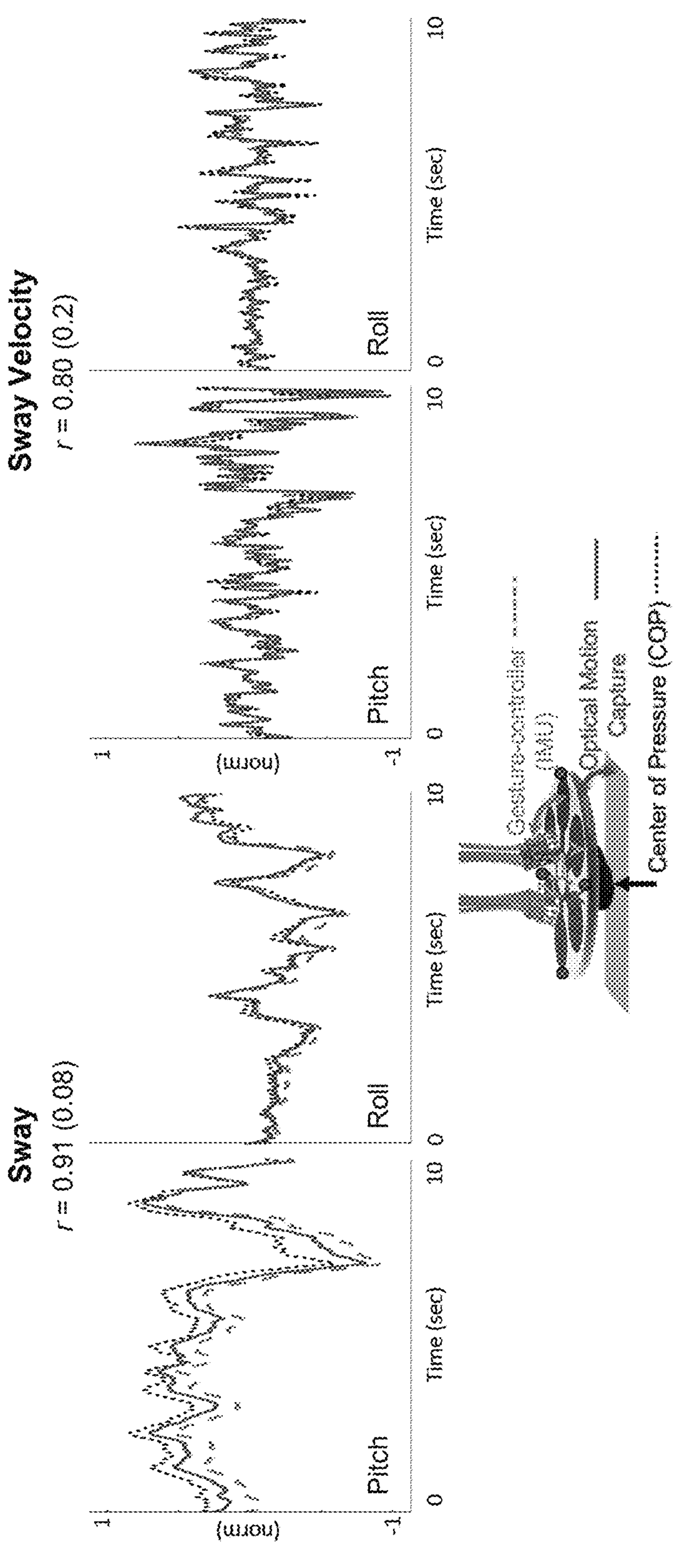

FIG. 16 shows representative COP, IMU and Optical motion capture pitch and roll trajectories normalized to the peak rectified value per trial for the no foam fast condition.

Figure 17:
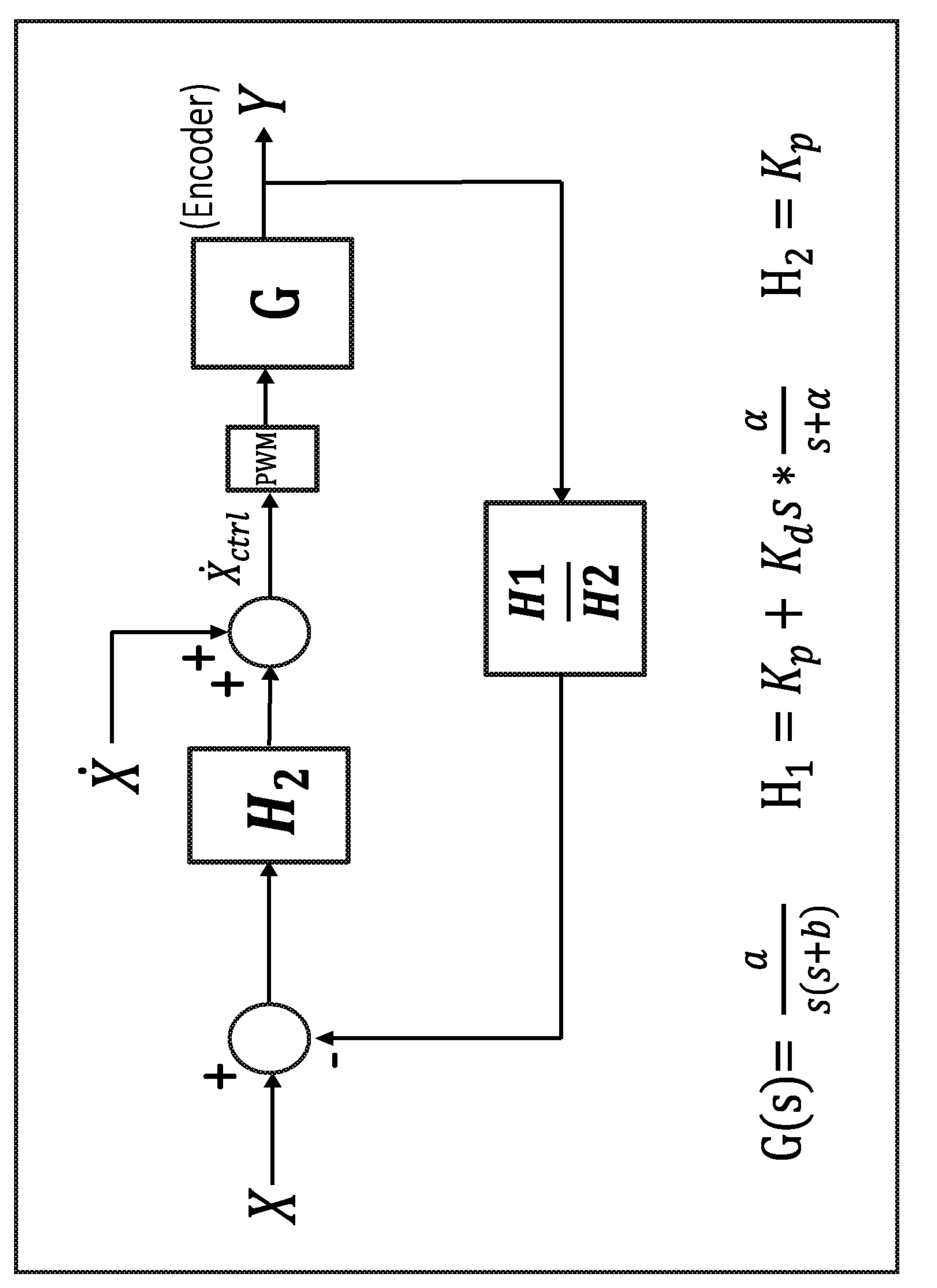

FIG. 17 shows an example of a closed-loop proportional-integral (PI) control loop implemented in Z-space according to the present disclosure.

DETAILED DESCRIPTION

Use of the robotic-based feedback systems, devices, and methods helps to shift attention away from the subject's movement outcome. The presently disclosed systems, devices, and methods help to achieve high doses of repetitive motion by the subject, thus promoting motor learning and engagement. The disclosed systems, devices, and methods also provide for telemonitoring of the subject's movement and performance. In many embodiments, the disclosed systems, devices, and methods may be used in a home environment.

Use of the proposed systems, devices, and methods involving robotic technology may offer unique opportunities to improve physical therapy for a wide range of populations through customized neuromuscular coordination training with 3D, real-time feedback. The disclosed methods are engaging and the systems, devices, and methods are easily deployable both in the clinic and at home. Historically "gamifying" rehabilitation is limited to a 2D screen, which has potential adverse health consequences with excessive use.

The presently disclosed mapping of body motion to the 3D world may be more intuitive than a screen and more effective in training the neuromusculoskeletal system to control balance in activities of daily living. The presently disclosed telerehabilitation intervention may also aid in conveying quantitative at-home recovery progress and easing clinic-based therapy time-burden and cost. In many embodiments, the disclosed systems, devices, and methods may aid in promoting long-term therapy adherence for more effective treatments. Further, continuous telemonitoring of movement performance can be used as a diagnostic tool by detecting deteriorations in motion control.

Disclosed herein are devices, systems, methods, and processes for gesture-controlled rehabilitation. The disclosed robotic-based feedback consists of a gesture controller that maps body movements to the motion of a physical robot in a three-dimensional (3D) space. This robotic cueing provides a goal-directed visuospatial task to control the robot's motion, shifting attention away from the body. Quantitative movement metrics are also stored on the robotic platform to telemonitor performance and remotely guide treatment/training. Continuous monitoring of movement performance can also serve as a diagnostic tool for movement disorders. Some objectives of the presently disclosed inexpensive and portable system are to improve adherence to training programs, promote motor learning through high doses of repetitive, coordinated motions, and to telemonitor movement performance in a home environment. Further, mapping body motion to the 3D world may be performed without reliance on a monitor, t.v. screen, or virtual-reality headset therefore avoiding potentially adverse health consequences of excessive screen use.

In some embodiments, the presently disclosed devices, systems, methods, and processes may provide cost-effective performance quantification, while providing engaging therapies for the subject; this may, in turn, lead to enhanced compliance, mobility, and effectiveness.

The disclosed hands-free, robotic-based feedback may be used with devices, systems, and methods related to neuromuscular coordination training and/or diagnostic devices for use at-home or in the clinic. Also disclosed are active toys to promote playful exercise, assistive robotic devices that map user motion to control objects in home environments, and monitoring injury risk and performance using touchless, gesture-controlled robotic operations for hands-free remote-control in industrial environments.

Physical therapy, a non-invasive treatment to address mobility impairments, requires high doses of repetitive exercise and coordinated movements to elicit improved function [1]. The monotony of these repetitive tasks contributes to low motivation and inconsistent participation, especially for home-based programs, with adherence to therapy ranging between 30 and 60% [2,3]. Furthermore, standard therapy sessions often fall short of the hundreds of repetitions required for neuroplastic motor recovery [4]. Without adequate training, functional deficits persist that hinder recovery. For example, impairments often linger in people with acquired brain injury due to a gradual recovery process requiring prolonged treatment to effectively target upper limb motor control deficits [5]. Long-term deficits also persist in people post-stroke, with 67% reporting continued disuse after four years [6]. As motivation and engagement are beneficial for successful rehabilitation [7] and compliance to post-acute rehabilitation care is associated with improved functional outcomes [8], engaging at-home therapy interventions are warranted for prolonged and effective treatment [9]. Rehabilitation through technology-based game therapy has the potential to improve compliance and dosage [10], quantify human motor performance [11], target motor control deficits [5], and improve engagement in various populations [12]. This type of therapy has also shown potential for motor learning, with a portion of this work previously presented at the IEEE Engineering in Medicine and Biology Conference [61].

Technology-based rehabilitation may improve standard therapy outcomes with motivating tasks and user feedback, which invite the repetition of intensive motion and motor learning. For example, a sensor-based therapy system improved arm-hand function in stroke survivors after the motor recovery plateau phase, which typically occurs six months post-therapy [14]. Specifically, they showed progressive and challenging task-oriented arm training with quantitative feedback improved upper-limb performance post-stroke by more than 10%. Furthermore, robot-assisted gait training elicited improved function in children with neurological gait disorders using virtual reality to promote engagement [15]. Video-game therapy also improved muscle activation for upper limb prosthesis control compared to the baseline, and users reported racing games as more engaging compared to rhythm games [16]. Furthermore, virtual reality-based rehabilitation supports retraining of movement planning and motor control, which could promote recovery from acquired brain injury [5]. Although the underlying mechanisms for the achieved recovery remain somewhat elusive, evidence suggests rehabilitation techniques that incorporate brain and body engagement promote neural plasticity [17], which is driven by user-initiated neuromuscular control.

Gesture control provides intuitive and efficient solutions in robotics, with specific applications including unmanned ground vehicles for military surveillance [18] and improved manufacturing safety and efficiency [19], robotic arm manipulation for prosthetic devices [20], robot-assisted surgeries [21], and robotic nursing-care assistants [22]. Rehabilitation robots that facilitate therapy with quantitative measures of movement performance have demonstrated potential as complementary assessment tools; however, they are typically limited to a clinical setting and are not easily translated to the home environment [23]. Despite the promising advantages related to gesture-based therapies, high complexity and cost [24], as well as a lack of portability [25] remain barriers to use. Affordable screen-based exergames commonly used in a home environment can be insufficiently challenging (Willaert, 2020), and benefits vary across people, suggesting that personalized training programs are needed (van diest, 2016). Tailoring goal-directed feedback training based on objective performance measures can lead to more effective treatments (Kappen, 2019). However, off-the-shelf exergames (e.g., WiiFit, Kinect) often do not provide valid objective measures of therapy progress (Wikstrom, 2012), do not correlate well with standardized balance tests (Reed-Jones, 2012), and have limited spatial and temporal movement accuracy (Bonnechere, 2013). In addition, excessive screen time may be detrimental to health [26], with potentially adverse physical, psychological, and neurological effects [27]. Therefore, alternative game therapies that are engaging and that do not require screen use are needed. The shortcomings of screen-based rehabilitation are well documented and are overcome with the methods and systems of the present disclosure. See, e.g., Lissak [27] describing adverse physiological and psychological effects of screen time on children and adolescents; Manwell [53] describing digital dementia in the internet generation: excessive screen time during brain development will increase the risk of Alzheimer's disease and related dementias in adulthood; Shaw [55] describing challenges in VR exergame design (includes motion sickness, health & safety concerns); Sheppard [56] describing digital device use continues to increase, digital eye strain occurs in ~50% of users with symptoms including eyestrain (asthenopia), headaches, blurred vision, dry eyes, neck pack, shoulder pain; Umejima [57] describing memory recall benefits of paper notebooks vs. mobile devices; Koch [58] describing the neurophysiology and treatment of motion sickness; Schmäl [59] describing neuronal mechanisms and the treatment of motion sickness; and Zhang [60] describing motion sickness: current knowledge and recent advance.

Figure 1:
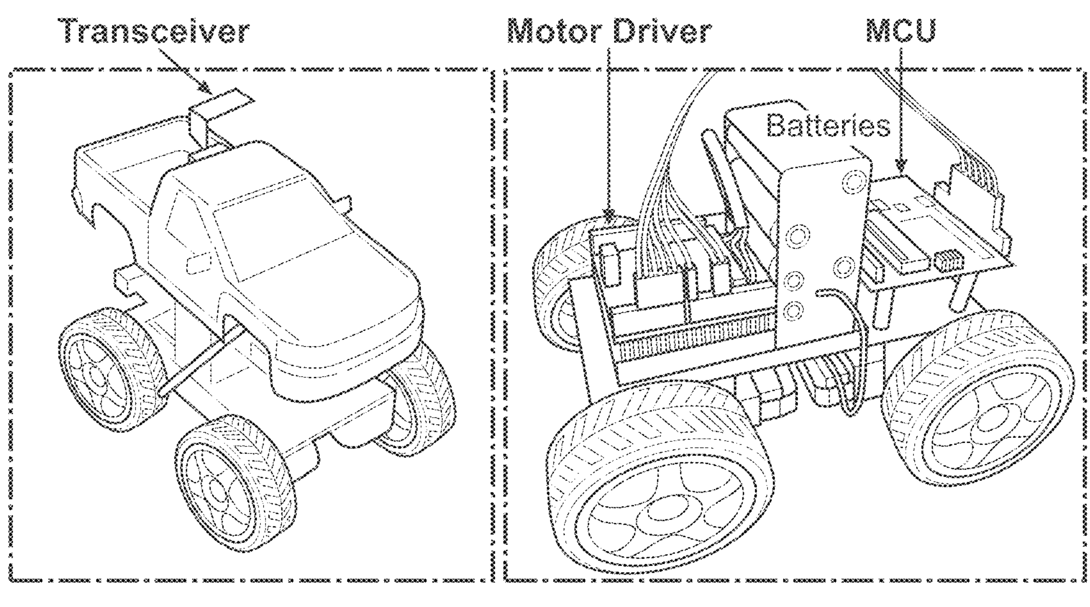
FIG. 1 depicts the gesture-controlled rehabilitation robot (GC-Rebot) includes a (left) motorized car with a microcontroller (MCU), motor driver, and radio transceiver, which are powered by eight AA batteries, and a (right) gesture controller with an IMU, radio transceiver, and miniature MCU, which are powered by a rechargeable lithium ion battery."
Figure 1:
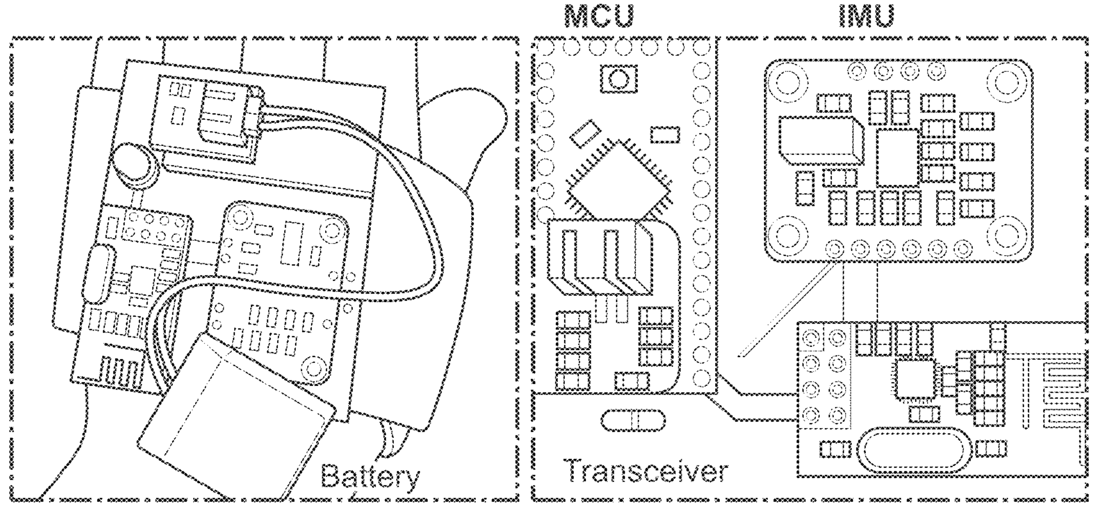

The goal of this work is to assess the feasibility of a portable, low-cost, easy-to-use, and engaging alternative to standard physical therapy for evidence-based rehabilitation. We designed a gesture-controlled rehabilitation robot (GC-Rebot) with wireless body movement control (FIG. 1) to mimic standard active range of motion exercises while also promoting brain and body engagement through hand-eye coordination training without the use of a screen. The following sections provide the methodological details of the GC-Rebot system design, human subject experiments, and data analysis. Motor learning based on quantitative metrics of movement quality and quantity and potential engagement through system usability and perceived effort are then assessed for a healthy population to characterize the feasibility of this approach. In addition, as learning can be affected by the skill level of the performer [28], we sought to compare users of varying spatial mapping skill levels based on prior video-game experience during a standardized training session with the GC-Rebot.

EXAMPLES

Figure 2:
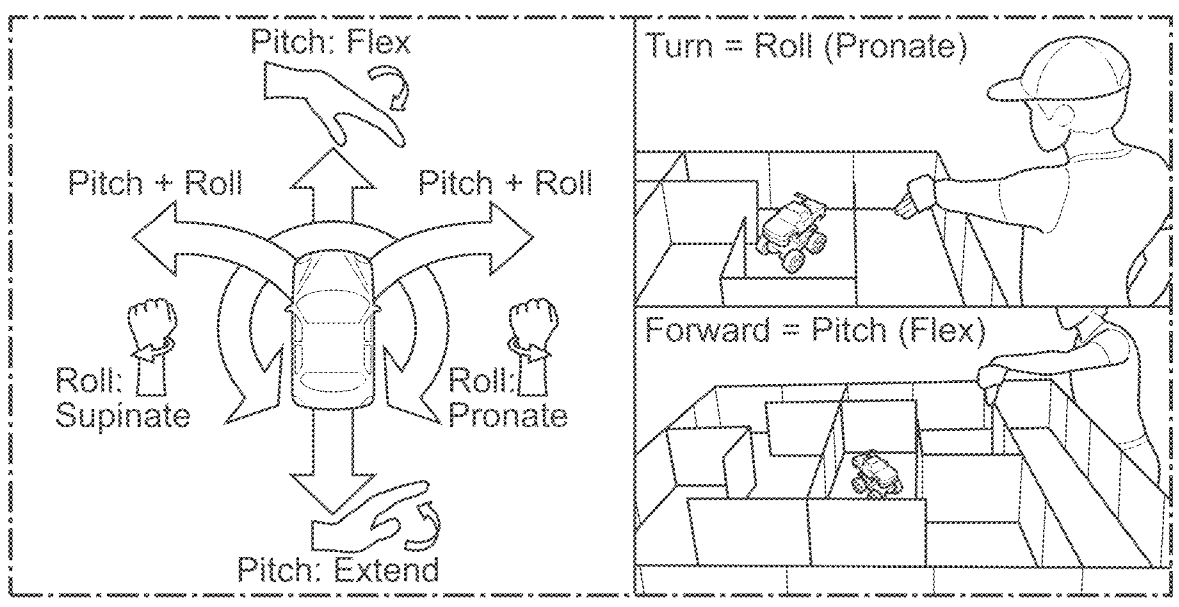
FIG. 2 depicts proportional car control for left-handed operations. (Left) Mapping between user gestures and car movements. Wrist flexion-extension (pitch) produces forward/backward motion; pronation-supination (roll) produces on-the-spot turning; and flexion combined with roll produces gradual arching turns. (Right) Typical hand gestures for translational and rotational car control during a testing session.

Example 1—Gesture-Controlled Rehabilitation Robot to Improve Engagement and Quantify Movement Performance 2.1. System Design The GC-Rebot system consists of a hand-mounted gesture controller and a motorized car (Table 1, FIG. 1). The gesture controller (55×45 mm, mass=26 g) includes an inertial measurement unit (IMU), which senses 3D linear accelerations and angular velocities, processes the signals in real-time with an embedded system, and transmits them wirelessly at 10 Hz. A commercially available four-wheel-drive platform (13.5×20 cm) was retrofitted with an Arduino microcontroller that provides proportional motor control of the wheel velocity based on the user's gestures, as depicted in FIG. 2.

TABLE 1

GC-Rebot gesture controller and motorized car specifications

| Part Type | Description | Details |
|---|---|---|
| | Gesture Controller | Total Cost: $60 |
| IMU | Adafruit BNO055 9-DOF | 5 V, 16 MHz |
| MCU | Adafruit ItsyBitsy (Atmega32u4) | 5 V, 16 MHz |
| Transceiver | NRF24L01 wireless module | 1.9-3.6 V, 2.4 GHz |
| Battery | Adafruit lithium ion polymer | 3.7 V, 150 mA |
| | Motorized Car | Total cost: $75 |
| Car Platform | SZDOIT Smart Robot Car Kit | 2 mm alum. panel |
| Motors | 4 TT DC Gearbox Motors (1:48) | 4.5 V, 200 RPM |
| Motor Driver | Quad DC motor driver shield | SKU: DRI0039 |
| MCU | Arduino Uno R3 (ATmega328P) | 5 V, 16 MHz |
| Transceiver | NRF24L01 wireless module | 1.9-3.6 V, 2.4 GHz |

An additional wireless IMU (MTw Awinda, Xsens Technologies B.V., Netherlands; 47×30×13 mm; mass=16 g), powered with an integrated LiPo battery and sampled via Bluetooth at 100 Hz (Xsens MT Manager 4.6, Windows 10) according to the manufacturer guidelines, provides accurate 3D orientation using on-board sensor fusion to compensate for sensor drift [29]. Mounted in parallel with the GC-Rebot gesture controller, this secondary IMU provides data to assess the user's motor performance.

The controlling software is split between the two platforms. The gesture-controller program uses the manufacturer provided data-fusion algorithms to extract the pitch and roll angles and then transmits them wirelessly to the car at 10 Hz. The car's program receives the transmitted data, also at 10 Hz, and maps hand orientations (pitch: $\theta_p$, roll: $\theta_R$) to the car's linear (v) and angular (ω) velocities according to, $$v = sat(\theta_p, -90°, 90°) * \frac{v_{max}}{90°} \quad (1)$$

-continued $$\omega = sat(\theta_R, -90°, 90°) * \frac{\omega_{max}}{90°} \quad (2)$$

where sat(·) is the saturation function, the maximum desired car linear velocity (vmax) is 0.3±10% m/s, and the maximum desired angular velocity (wmax) is 1.8±10% rad/s. These velocities were chosen through pilot testing to provide a reasonable balance between precision and speed for the given task.

Figure 3:
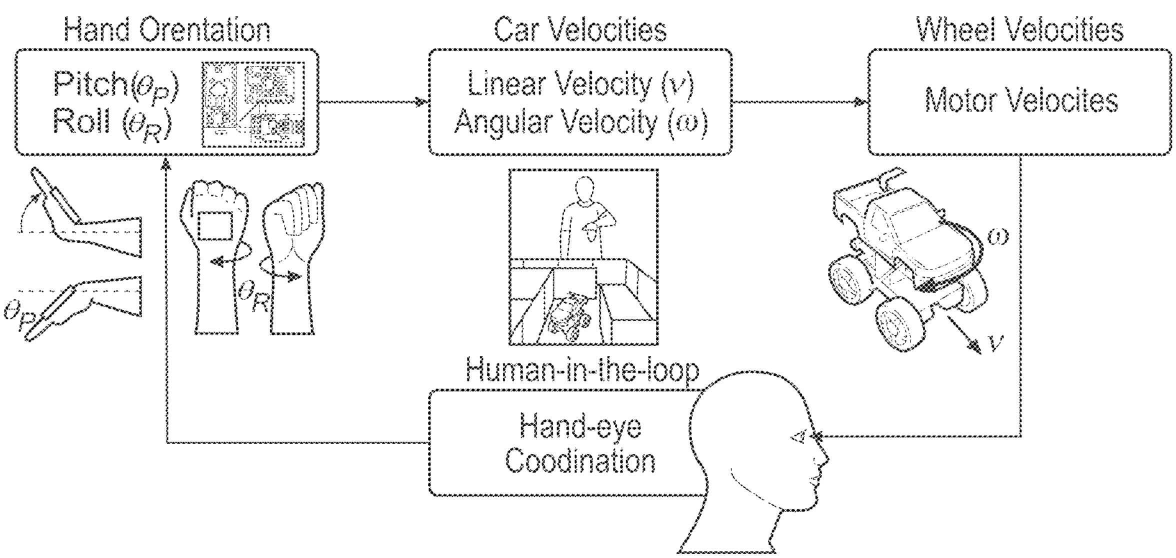
FIG. 3 is a schematic of GC-Rebot system design, showing hand orientations are mapped to car velocities (v,w) and converted to motor velocities for proportional open-loop motor control.

After mapping gesture motions to motor velocities, directional control is established with conditional statements based on the sign and ratio of pitch and roll (FIG. 2). Subsequently, user hand-eye coordination provides feedback to the system through human-in-the-loop control, which incorporates perception, cognition, planning, transmission, and movement execution (FIG. 3). That is, the user perceives the car's movements relative to the maze, plans a desired car trajectory, and then executes the appropriate wrist pitch and roll to maneuver the car efficiently. Through this process the user may quickly adapt to optimize the trade-off between car speed and accuracy (i.e., avoiding wall contacts) [30].

Human Subject Experiment

Eleven participants (healthy by self-report, male=6, female=5; right hand dominant=10; 28.9±5.6, 21-39 years old) with no prior GC-Rebot experience provided their informed consent to participate in this study. The study was conducted in accordance with the Declaration of Helsinki, and the protocol was approved by the Institution's Ethical Review Committee. To categorize the participants' spatial mapping skill level, they rated their video-game experience as either none (n=1), novice (n=5), or experienced (n=5). These categories will be used throughout the paper exclusively to group participants based on their prior video-game experience.

The gesture controller was secured to each participant's hand using a fitted glove and elastic over wrap. This fitting involved first placing the Xsens IMU in the small pouch sewn to the dorsal side of the glove provided by the manufacturer. Then, the gesture controller was mounted in parallel and secured with the over wrap. After brief instruction on gesture-controller operation, participants were given a one-minute practice session outside of the maze. For the performance tests, they were instructed to navigate the test maze (FIG. 4) as fast as possible, beginning each trial with their hand positioned flat relative to the floor. Participants were free to move around the maze. Trials began with an audible command to start and were considered complete when the car made contact with the wall at the finish. Prior to conducting subsequent trials, the car was returned to the initial starting location. Participants performed three consecutive trials starting with either their dominant or non-dominant hand, which was randomized across participants. After completing the first three maze trials, the gesture controller was switched to the participant's opposite hand; they then repeated the one-minute practice session outside of the maze, followed by three additional maze trials.

Questionnaires

All participants completed the validated System Usability Survey for technology-based applications [32], which consisted of 10 questions that asked participants to rate the system's usability on a five-point Likert scale [33] ranging from strongly disagree (1) to strongly agree (5). The overall score (average across 10 questions) indicates perceived system usability. Participants also rated the level of effort used for each hand on a five-point Likert scale ranging from exhausting (1) to effortless (5). In addition, participants self-reported their dominant hand as their preferred writing hand.

2.4. Data Analysis

Xsens IMU pitch and roll angle and angular velocity signals were zero-meaned and used to quantify movement quality and quantity for each trial. Mean wrist active range of motion was defined as the average pitch or roll angular excursion (i.e., flexion-extension/pronation-supination) across each trial. Movement smoothness was quantified as the natural log of dimensionless hand angular acceleration $\ddot{\theta}_{lnD}$, which was adapted from [34], as follows:

$$\ddot{\theta}_{lnD} = -\ln\left(\frac{(t_2 - t_1)^2}{\dot{\theta}_{peak}^2}\int_{t_1}^{t_2}|\ddot{\theta}(t)|^2\,dt\right) \tag{3}$$

where $\dot{\theta}_{peak}$ is the maximum angular velocity and $\ddot{\theta}(t)$ is the first time-derivative of angular velocity. The hand angular accelerations were chosen as a proxy for smoothness because they map to car jerk, just as hand orientations map to car velocities. As improved motor coordination in patients post-stroke can be linked to reduced jerk [34,35], minimizing car jerk through reduced hand angular accelerations may imply improved movement performance. Total angular excursion ($\theta_{Tot}$) was also quantified as the summed angular trajectory across each trial, where $\dot{\theta}(t)$ is the angular velocity, $$\theta_{Tot} = \int_{t_1}^{t_2}|\dot{\theta}(t)|\,dt \tag{4}$$

Movement quantity for each trial was quantified as the number of movement repetitions, dose-rate (reps/min), and total task duration. Movement repetitions were quantified by the peaks in the angular velocity signal, which was smoothed with a 2 Hz cutoff 4th-order Butterworth filter. Finally, the potential for engagement was assessed through system usability and perceived effort survey scores. A two-way analysis of variance (ANOVA, $\alpha=0.05$, $p<0.05$) was used to detect mean differences in outcome metrics for two independent factors (trial number and video-game experience). Experienced (n=5) and novice (n=5) categories were compared in the analysis. A similar ANOVA was performed to test differences between effort score with two independent factors (hand dominance and video-game experience) and to test differences between usability survey scores with one independent factor (video-game experience). To demonstrate the learning effect, differences by video-game experience, trial duration, and either the number of repetitions, total excursion, smoothness, or dose-rate for the first and last trials are reported as 75% confidence interval ellipses. Correlation coefficients (r) [36] and coefficients of determination ($r^2$) [37] were also calculated across all trials to quantify the strength of these relationships. As only one participant reported no video-game experience, these results were assessed separately.

A frequency response analysis was performed to assess future data collection rates suitable for the GC-Rebot. The Xsens IMU pitch and roll angle, angular velocity, and angular acceleration signals were low pass filtered (2nd-order Butterworth, 5 Hz cutoff) to estimate the effects of reducing the sampling rate to 10 Hz, which is equivalent to the GC-Rebot's on-board IMU transmission speed to the car platform (FIG. 5). A fast Fourier transform (FFT) was conducted to assess the frequency content of the IMU signals, and mean differences between the filtered and unfiltered metrics were quantified. The subsequent analysis was completed with the unfiltered signals.

Results 3.1. Quantitative Performance Metrics

The mean and standard deviation (mean±SD) movement quality metrics across participants with video-game experience (n=10) revealed relatively consistent pitch and roll active range of motion across trials, with 35 degrees less overall pitch range of motion compared to roll (see the first row in FIG. 6 and Table 2). Compared to the experienced participants, the novice group showed larger changes in both total angular excursion and pitch angular smoothness between the first and last trials (FIG. 6, Table 2). A larger learning effect was also observed for movement quantity of the novice participants compared to the experienced group (FIG. 7, Table 3). For example, novice participants performed fewer repetitions and had a shorter trial duration to complete the last trial compared to the first; however, dose-rates for pitch and roll remained consistent for both novice and experienced participants, with an overall average of 24.2±5 reps/min across trial and movement (Table 3).

TABLE 2

Movement quality performance and learning differences for participants with video-game experience (n = 10). Descriptive statistics (mean ± SD) are presented across participants and trials. Motor learning was compared between the novice (ΔNov, n = 5) and experienced (ΔExp, n = 5) groups by evaluating each group's change in metric between the first and last trials. The corresponding percent differences (% Diff) are also included. Significant differences (p < 0.05) are indicated with bold font.

| Metric | | Mean ± SD | ΔNov | % Diff | ΔExp | % Diff | p-Value |
|---|---|---|---|---|---|---|---|
| Active Range of | Pitch | 41.6 ± 13 | −11.8 | −28% | −1.3 | −3.1% | 0.3 |
| Motion (°) | Roll | 76.8 ± 16 | −12.9 | −17% | −3.4 | −4.4% | 0.2 |
| Smoothness ($\ddot{\theta}_{lnD}$) | Pitch | −14.1 ± 0.9 | 1.8 | 13% | 0.80 | 5.7% | **0.04** |
| | Roll | −14.1 ± 0.7 | 1.4 | 10% | 0.99 | 7.0% | 0.4 |
| Total Ang. | Pitch | 3150 ± 1490 | −3170 | −101% | −967 | −31% | **0.03** |
| Excursion: $\theta_{Tot}$ (°) | Roll | 4710 ± 1770 | −3440 | −73% | −1090 | −23% | **0.01** |

TABLE 3

Movement quantity performance metrics and learning differences for participants with video-game experience (n = 10). Descriptive statistics (mean ± SD) are presented across participants and trials. Motor learning was compared between the novice (ΔNov, n = 5) and experienced (ΔExp, n = 5) groups by evaluating the change in metric between the first and last trials. The corresponding percent differences (% Diff) are also included. Significant differences ($p < 0.05$) are indicated with bold font.

| Metric | | Mean ± SD | ΔNov | % Diff | ΔExp | % Diff | p-Value |
|---|---|---|---|---|---|---|---|
| Number of Repetitions | Pitch | 28.5 ± 9 | −20.8 | −73% | −7.4 | −26% | **0.04** |
| | Roll | 25.8 ± 7 | −13.4 | −52% | −2.0 | −7.8% | **0.02** |
| Dose-rate (reps/min) | Pitch | 25.1 ± 5 | −3.8 | −15% | −2.7 | −11% | 0.9 |
| | Roll | 23.2 ± 5 | 0.25 | 1.1% | 3.2 | 14% | 0.4 |
| Trial duration (s) | | 68.3 ± 19 | −38.9 | −57% | −10.3 | −15% | **0.03** |

Focusing only on the first and last trials, the qualitative differences in motor learning between participants can be observed in FIG. 8. The novice participants demonstrated larger decreases in trial duration, which were associated with larger reductions in the number of repetitions and total angular excursion, as well as larger increases in angular smoothness compared to the experienced group. Furthermore, by the last trial, the novice participants' motor performance was similar to that of the experienced participants, as shown by the overlapping Trial 6 sample-distributions in FIG. 9. Across all trials, the correlation coefficients ranged between 0.9 and 0.93 between trial duration and either the number of repetitions, total pitch angular excursion, or smoothness for the novice participants, which is significant (Table 4). These correlations corresponded to coefficients of determination ($r^2$) that imply 80-86% of the variance in movement quality/quantity can be explained by the variation in overall performance (time duration) [37]. However, the only potentially linear relationship for the experienced participants was between trial duration and smoothness. Dose-rate was weakly correlated with trial duration for both groups ($r^2<0.35$).

TABLE 4

Correlation coefficients (r) across all trials quantifying the strength of the relationship between trial duration (s) and motor performance metrics for novice and experienced participants. Significant differences ($p < 0.05$) are indicated with bold font.

| Metric | | Novice | | Experienced | |
|---|---|---|---|---|---|
| | | r | p-Value | r | p-Value |
| Number of Repetitions | Pitch | 0.909 | **0.0000** | 0.613 | **0.0003** |
| | Roll | 0.906 | **0.0000** | 0.363 | 0.05 |
| Total Ang. Excursion (°) | Pitch | 0.910 | **0.0000** | 0.407 | **0.03** |
| | Roll | 0.685 | **0.0000** | 0.383 | **0.04** |
| Smoothness ($\ddot{\theta}_{lnD}$) | Pitch | −0.929 | **0.0000** | −0.771 | **0.0000** |
| | Roll | −0.896 | **0.0000** | −0.831 | **0.0000** |
| Dose-rate ($^{reps}/_{min}$) | Pitch | 0.102 | 0.6 | −0.430 | **0.02** |
| | Roll | −0.356 | 0.05 | −0.582 | **0.0008** |

The quality of motor performance of the participant with no prior video-game experience differed from the other participants (FIG. 10). Across trials, this participant performed smaller active ranges of motion (pitch: 24.9±8°, roll: 40.9±3°), had less smooth angular movements (pitch and roll: −17.5±1), and had greater total angular excursion (pitch: 5680±2350°, roll: 9740±2800°). This participant's quantity of movement also differed from the other users (FIG. 11), with consistently more repetitions (pitch: 52±24 reps, roll: 64±16 reps), longer trial duration (277±79 s), and lower dose-rates (pitch: 11.1±3 rep/min, roll: 14.0±2 reps/min) across trials.

3.2. Signal Processing

Most of the frequency content of the Xsens IMU pitch and roll angles and angular velocities were well below the 5 Hz low pass filter cutoff (FIG. 12). Therefore, applying a 5 Hz filter to this dataset produced only small differences in the mean outcome metrics (0.2-5%) compared to the unfiltered data and no change in statistical correlations. Although larger effects were demonstrated for linear acceleration (FIG. 12), this signal was not included in the assessments of movement performance.

3.3. Surveys

The average system usability scores across the participants with video-game experience (86.3±12) corresponded to a rating of excellent [38]. Differences were not detected in the usability score between the novice and experienced participants (p=0.4); however, the novice scores were twice as variable (FIG. 13). Separating the survey questions into use (eight items) and learnability (two items) categories [39,40], two of the three responses by the participant with no video-game experience were associated with learnability, contributing to the lower than average usability score (72.5) (FIG. 13). This participant also reported that the effort to complete the task was exhausting (1) and near exhausting (2) for his/her non-dominant and dominant hands, respectively (FIG. 14). These ratings corresponded to 62% and 41% more effort compared to the effort ratings reported by the experienced and novice participants. However, those with experience also reported greater effort with their non-dominant hand (2.6±0.5) compared to their dominant hand (3.4±0.5), which is significant (p=0.004).

Discussion

The GC-Rebot system, which uses coordinated hand gestures to wirelessly control a motorized car through a maze, was assessed as a potential alternative to physical therapy. This study characterized movement performance through quantitative assessments of movement quality and quantity, which revealed a high dose-rate compared to standard physical therapy with mean active ranges of motion that were 30-50% of the typically available range (120°-160°). This intense execution of simple wrist movements replicates functional training, which is a key element to rehabilitation that forms a foundation for normal movements [7]. Differences in motor learning and system learnability between participants with varying levels of hand-eye coordination experience suggest that user-specific challenge levels could promote learning and satisfaction, which could be leveraged for treatment. Specifically, altered maze courses, tunable controller gains, and adjusted deadbands could elicit various challenges and ranges of motion dependent on the user's therapy goals. In addition, this versatile platform affords attachment to different body segments to expand therapy to other joints (e.g., ankle, elbow) and has the potential to accommodate participant-specific neutral positions and gesture thresholds for varied limb impairments.

4.1. Quantified Performance

The movement performance metrics produced objective assessments that characterized user behavior while conducting GC-Rebot training. The average participant performed 180 full wrist motion repetitions over a 5-10 min session (six trials with approximately 30 repetitions each). The corresponding average dose-rate (24 reps/min) represents an almost seven-fold increase in the dose-rate achieved during active exercise repetitions in a standard 30 min therapy session (0.5-3.5 reps/min) [4]. These results suggest that a 25-min training session with GC-Rebot could attain the adequate dosage (300-400 repetitions) to promote neuroplastic motor recovery [1].

Furthermore, this session duration is half the time compared to a study of stroke survivors who achieved 322 reps in a 60-min therapy session [41]. In Birkenmeier et al. [41], therapists tracked the number of repetitions and rated task performance to identify when to increase the level of challenge. Sensor-based technology such as GC-Rebot can automate measurements of movement performance, impairment, and recovery progress outside the clinic to ease the burden on therapists and increase assessment frequency, sensitivity, and resolution [34].

4.2. Skill-Based Motor Learning

Beyond a high dosage through repetitive movement, brain reorganization also involves learning [1]. Our study results demonstrate that GC-Rebot training of a novel wrist coordination task elicits motor learning, with increased rates for novice users. For example, faster maze completion times were correlated with increased movement smoothness and reduced total angular excursion.

Grouping the data across users and trials contributed to the relatively high variation in these quantitative metrics (25% of the mean on average across metrics), which is similar to the variation in wrist movements related to a goal-directed, voluntary task in a virtual reality environment [42]. This varied user performance likely relates to skill level and strategy differences and is consistent with a prior study, which suggested between-participant performance is highly variable [43]. Furthermore, wrist rotation coordination demonstrates more variability compared to the more commonly targeted gross proximal movements associated with reaching tasks [44]. Minimizing user performance variation with an optimal level of challenge could leverage motor learning and enhance engagement.

A game therapy approach promotes implicit learning [45] based on the intrinsic feedback to the user through self-evaluation on task performance and enhanced motivation [1,46]. Furthermore, this high-frequency, concurrent feedback on a relatively complex task has been suggested to be effective for learning, potentially through the automation of movement control [46,47]. Applying these techniques to wrist therapy, which is a less frequently targeted treatment by robotic rehabilitation systems, has the potential to reduce impairment because functional gains in upper extremity movements are dependent on coordinated distal motion (i.e., wrist/hand) [45]. For example, a robotic system that targeted wrist motion reduced motor deficits, quantified by increased wrist extension and improved functional survey scores [42]. Furthermore, the relative novelty of a gesture-controlled training paradigm could promote initial interest by minimizing preconceived expectations of successful performance. In contrast to performing a task that was easily mastered prior to the impairment, this approach may avoid initial frustration and promote engagement. As a supplement to the standard of care and targeted task-specific training, the potential benefits of GC-Rebot therapy lie in the targeting of coordinated wrist movements and implicit learning of the underlying capabilities used for many functional tasks; however, the direct translation to improved function, particularly within an impaired population, remains an area for future study.

The participant with no video-game experience was less skilled and further challenged by GC-Rebot training compared to the other users, performing the task with 43% less active range of motion and 19% less smooth movements (i.e., more negative), producing a four-fold increase in trial times and 45% and 60% more pitch and roll repetitions, respectively. The dose-rate was also 48% smaller across trials for this participant. The consistently reduced performance from this less-skilled individual corresponds to 51% greater perceived effort across limbs and a 16% lower usability score, which may negatively affect compliance and motor learning in a physical therapy application. These results suggest that dose-rate, movement quality, perceived effort, and engagement are related to skill level and that tailoring the task to individual ability could optimize training effects. That is, these quantitative movement metrics collected during the trials have great potential to guide user-specific settings for achieving adequate and progressive levels of challenge to leverage motor learning [28]. For example, matching the user's skill level to task difficulty can prevent frustration, boredom, and fatigue [5], which is important for promoting motor learning and engagement [10], especially for users with physical and cognitive impairments [48]. Finally, as treatment progresses, resistance to wrist motion or grasping real-world household objects (e.g., pencil, hammer) could be added to further address strength and dexterity deficits. Associating movement performance metrics with the appropriate cognitive and physical challenge levels during a therapy session and throughout the course of treatment for maximized motor learning is an important extension of this work.

4.3. Engagement: Usability and Effort

An affordable, easy-to-use, and entertaining form of physical therapy that promotes motor learning and can be conducted in a home environment is beneficial for prolonged and effective treatments. These programs are especially important in the long-term care of people post-stroke, where arm-hand recovery post-stroke lags other functions [49]. With a total cost of less than $200 and "excellent" user ratings according to [38], GC-Rebot demonstrates potential as an engaging, intuitive telerehabilitation solution to address the cost-prohibitive nature of prolonged therapy [4]. The usability survey was chosen because it is reliable with small samples (8-12 people) and has become the industry standard [38]. However, some inherent bias in participant responses may exist due to the unblinded study design. One way to improve usability is to minimize the number of sensors donned by the user by eliminating the use of a separate IMU. This system simplification can be realized by adding data acquisition to the car platform for on-board IMU data analysis. The FFT analysis confirms that the 10 Hz wireless transmission between the gesture controller and car is sufficient to quantify performance and motor learning while conducting GC-Rebot training.

The positive user experience was associated with a task that expended effort, especially when performed with the non-dominant hand. This effort corresponded to the repetitive active range of motion and neuromuscular coordination used to control the car, which can be adapted according to an individual's impairment level. For example, the present maze produced pitch excursions that were on average 30% of the typically available range of motion (120°-160°), due to its short, forward, straight segments. However, larger roll excursions (50% of the typically available range of motion) were frequently used for turns. Longer, straight segments with additional backward driving opportunities and adjusted proportional control with a deadband could increase the user's active range of motion. Alternatively, fewer turns and reduced controller thresholds could lessen the challenge, which may be appropriate to promote engagement and motor learning for users with less experience [28] or neuromusculoskeletal deficits [5].

Future work should examine the system's ability to promote therapy compliance toward improved motor performance in an impaired population. For example, gesture-controlled game therapy may alleviate precision and coordination deficits in people post-stroke through targeted visuospatial coordination and motor planning rehabilitation [50]. Inspired by the potential for improved functional outcomes with video-game (2D) or virtual reality-based (non-physical environment) therapy [5,15,16], the GC-Rebot involves a 3D, physical environment with spatial mapping concurrent feedback, which may alter the user's perceptual input, planning, and associated motor control [51]. For example, learning tai chi movements with a 3D immersive system was more effective compared to a 2D video [52]. These findings suggest that a task performed in a 3D environment can elicit different motor learning and functional outcomes; therefore, further research is warranted to confirm whether motor learning and improved function can be achieved through GC-Rebot therapy.

5. Conclusions

Through intuitive gesture control, the GC-Rebot system provided quantitative assessments of movement performance with a user-friendly and engaging activity, which may promote therapy compliance. Enhanced engagement, affordability, and a high dose-rate support the GC-Rebot's potential as an effective tool for evidence-based at-home rehabilitation.

Example 2—Telerobotic Gesture Control to Quantify Balance (Wobble Board) Training Performance Dynamic balance training with a wobble board (WB) is effective for treating ankle instability and balance deficits [Wester, J. U. et al, J Orthop Sport Phys Ther, 1996. 23(5): 332-6, and Kosse, N. M. et al, J Cyber Ther Rehabil, 2011. 4(3): 399-407]. However, treatment efficacy is contingent on long-term adherence to therapy programs, which remains challenging [Schneider, J. K. et al, *J Gerontol Nurs,* 2003. 29(9): 21-31]. To address this problem, instrumented WB therapy with 2D feedback [Kosse] is a goal-directed approach involving continuous, voluntary postural adjustments to actively shift attention to the movement outcome. However, instrumented therapy devices often do not easily translate to the home [Balasubramanian, S. Am J Phys Med Rehabil, 2012. 91(11): S255-69.]. Affordable, uncumbersome sensors that reliably quantify balance performance could facilitate at-home rehabilitation. Although instrumented WB and force plate center of pressure (COP) velocities during static standing are strongly correlated [Bizovska, L. Med Eng Phys, 2017. 50: 29-34], balance performance during standard dynamic WB training [Wester] is less established. Although 2D game interfaces are promising for at-home rehabilitation, excessive screen time may be detrimental [Barlett, N. D. et al, J Child Media, 2012. 6(1): 37-50]. Alternatively, telerobotic biofeedback from a physical robot's movement may provide intuitive and engaging gesture-controlled therapy [Gamecho, B. et al, J Med Syst, 2015. 39(11): 1-11]. We explored quantifying balance training performance with gesture-controlled signals by comparing foot-mounted inertial measurement unit (IMU) sway angle and velocity to two gold-standard motion capture laboratory measurements: force plate COP and optical motion capture WB angle.

Two healthy adults (21.5±0.7 yrs) provided informed consent to participate in this approved study. The gesture controller (FIG. 15 Panel A, [Segal, A. D. et al, Sensors, 2020. 20(4269): 1-18]) was secured to the dorsal side of the non-dominant foot with zero-offsets established during quiet standing on a stable surface to accommodate differences in foot mounting location. Euler angles from the IMU (pitch/roll) were calculated and transmitted wirelessly at 100 Hz. Three-dimensional motion analysis was performed with a seven-camera motion capture system (150 Hz) and COP was collected with a concealed force plate (1500 Hz). Four markers each were placed on the WB and car platform.

Telerobotic gesture control was developed by mapping IMU angle (pitch/roll) to car velocity (linear (v)/angular (ω)). The telerobotic platform (FIG. 15 Panel B) included a robot kit (Zumo 32U4, Pololu) and dual motor drive system with quadrature encoders (12 counts/rev) for closed-loop proportional-integral speed control of each wheel. See, e.g., FIG. 17. A microcomputer (Raspberry Pi 3B+) performed high level processing and IMU data acquisition.

After being instructed on system controls, participants performed two-minutes of structured practice driving the car using WB tilting motion. Next, they navigated the telerobot through a figure-eight maze for three repeated trials (FIG. 15 Panel C).

This paradigm was repeated for three challenge levels in the following order: (1) with foam under the board and slow car speed response (2) no foam and slow car speed response, and (3) no foam and fast car speed response, to study the effect of varied conditions on signal validity. All trials were performed barefoot with the medial borders of the feet touching and aligned with the WB reference frame.

All data were zero-meaned, filtered (4th-order Butterworth, fc=10 Hz), and normalized by the peak of the rectified signal per trial. COP trajectories were rotated into the WB reference frame. Sway velocity was also calculated using a first order finite difference. COP and WB signals were down-sampled to the IMU sampling rate. Pearson correlation coefficients (r) were calculated for COP (X/Y positions), optical motion capture WB angles (pitch/roll) and IMU gesture controller (pitch/roll) sways and velocities to assess agreement between signal pairs: IMU-COP, IMU-Optical, Optical-COP.

Results and Discussion

All signals were strongly correlated (FIG. 16), with mean (±SD) sway correlations across trials and participants highest for Optical-COP (r=0.93±0.08) compared to IMU-Optical (r=0.92±0.08) and IMU-COP (r=0.89±0.09, all p<0.001). Velocity signals were also strongly correlated (r=0.80±0.2), albeit less strongly and more variable than sway. Correlations were similar (<3% difference) on the pitch and roll axes and across all challenge levels. The weaker correlation for IMU-COP may be related to subtle foot motion that is not reflected in COP and WB angle. Mounting the IMU directly to the WB may increase signal congruency and reduce inter-subject variation.

Significance

An engaging alternative to balance therapy using gesture-control sensors with lab-level monitoring performance has potential to track remote training progress for customized at-home therapy. This approach could reduce therapy time and cost, promoting long-term adherence and efficacy.

Example 3—an Example of a Method for Controlling a Robot with Devices and Systems of the Present Disclosure is Discussed Below Example Robotic Feedback System Controls IMU pitch and roll angles ($\theta_P$, $\theta_R$) were sent wirelessly via radio communication (SPI protocol) to the on-board microcomputer and converted to linear (v) and angular (a) car velocities according to, $$v = \beta_{P1}\theta_P + \beta_{P0} \tag{5}$$

$$\omega = \beta_{R1}\theta_R + \beta_{R0} \tag{6}$$

where the slopes and intercepts were defined experimentally as $\beta_{P1}$=0.978, $\beta_{P0}$=1.956, $\beta_{R1}$=4.891, $\beta_{R0}$=9.782. These values can be tuned for different car sensitivities. Car linear and angular velocities were then converted to motor velocities (mv) based on the kinematic equation:

$$mv = v \pm \omega * \frac{L}{2} \tag{7}$$

where L was the horizontal distance between wheel axles (9 cm). Motor velocities were converted to counts per second according to the encoder specifications (12 counts/rev, gear ratio: 75:1). The error in desired counts ($X_{error}$) was used as the command signal ($\dot{X}_{ctrl}$), which was remapped to PWM for closed-loop proportional-integral (PI) control of each motor.

System identification (as shown for example in FIG. 17) was performed in Matlab by defining a transfer function (Eq. 8) and continuous-time control transfer functions (Eq. 9, 10), based on poles chosen with a 3rd order Bessel filter ($\omega_n=2\pi/T_p$):

$$G(s) = \frac{a}{s(s+b)} \tag{8}$$

$$H_1 = K_p + K_d s * \frac{\alpha}{s+\alpha} \tag{9}$$

$$H_2 = K_p \tag{10}$$

The continuous system (H1/H2) was then discretized and implemented as a Z-transform controller, where the Z-transform (Eq. 11) was converted to a difference equation (Eq. 12).

$$TF = \frac{\text{output}}{\text{input}} = \frac{\sum_n B_n * z^n}{\sum_m A_m * z^m} \tag{11}$$

$$y_n = \frac{B_0 x_n + B_1 x_{n-1} - A_1 y_{n-1}}{A_0} \tag{12}$$

The inputs (X) were defined as the count error ($X_{error}=X_{des}-X_{act}$) and the outputs (Y) were the control effort. Velocity control was implemented by updating $X_{des}$ as follows:

$$X_{des} = X_{des} + \dot{X}_{des} dT \tag{13}$$

where $\dot{X}_{des}$ was the desired counts per second multiplied by the time step.

The final control output was calculated as:

$$y_n = K_p * X_{error} + \dot{X}_{des} \tag{14}$$

REFERENCES

1. Pomeroy, V.; Aglioti, S. M.; Mark, V. W.; McFarland, D.; Stinear, C.; Wolf, S. L.; Corbetta, M.; Fitzpatrick, S. M. Neurological principles and rehabilitation of action disorders: Rehabilitation interventions. Neurorehabil. Neural Repair 2011, 25, 33S-43S.
2. Taylor, A. H.; May, S. Threat and coping appraisal as determinants of compliance with sports injury rehabilitation: An application of Protection Motivation Theory. J. Sport. Sci. 1996, 14, 471-482.
3. Sluijs, E. M.; Knibbe, J. J. Patient compliance with exercise: Different theoretical approaches to short-term and long-term compliance. Patient Educ. Couns. 1991, 17, 191-204.
4. Lang, C. E.; MacDonald, J. R.; Reisman, D. S.; Boyd, L.; Kimberley, T. J.; Schindler-Ivens, S. M.; Hornby, T. G.; Ross, S. A.; Scheets, P. L. Observation of amounts of movement practice provided during stroke rehabilitation. Arch. Phys. Med. Rehabil. 2009, 90, 1692-1698.
5. Levin, M. F.; Weiss, P. L.; Keshner, E. A. Emergence of virtual reality as a tool for upper limb rehabilitation: Incorporation of motor control and motor learning principles. Phys. Ther. 2015, 95, 415-425.
6. Broeks, J. G.; Lankhorst, G. J.; Rumping, K.; Prevo, A. J. H. The long-term outcome of arm function after stroke: Results of a follow-up study. Disabil. Rehabil. 1999, 21, 357-364.
7. Yue, Z.; Zhang, X.; Wang, J. Hand rehabilitation robotics on poststroke motor recovery. Behav. Neurol. 2017, 2017, 1-20.
8. Duncan, P. W.; Horner, R. D.; Reker, D. M.; Samsa, G. P.; Hoenig, H.; Hamilton, B.; LaClair, B. J.; Dudley, T. K. Adherence to postacute rehabilitation guidelines is associated with functional recovery in stroke. Stroke 2002, 33, 167-78.
9. Timmermans, A. A.; Seelen, H. A.; Willmann, R. D.; Kingma, H. Technology-assisted training of arm-hand skills in stroke: Concepts on reacquisition of motor control and therapist guidelines for rehabilitation technology design. J. Neuroeng. Rehabil. 2009, 6, 1-18.
10. Lohse, K.; Shirzad, N.; Verster, A.; Hodges, N.; Van der Loos, M. Video games and rehabilitation: Using design principles to enhance engagement in physical therapy. J. Neurol. Phys. Ther. 2013, 37, 166-175.
11. Zollo, L.; Rossini, L.; Bravi, M.; Magrone, G.; Sterzi, S.; Guglielmelli, E. Quantitative evaluation of upper-limb motor control in robot-aided rehabilitation. Med. Biolog. Eng. Comp. 2011, 49, 1131-1144.

12. Graves, L. E.; Ridgers, N. D.; Williams, K.; Stratton, G.; Atkinson, G.; Cable, N. T. The physiological cost and enjoyment of Wii Fit in adolescents, young adults, and older adults. J. Phys. Act. Health 2010, 7, 393-401.
13. Segal, A. D.; Lesak, M. C.; Suttora, N. E.; Silverman, A. K.; Petruska, A. J. iRebot: An interactive rehabilitation robot with gesture control. In Proceedings of the IEEE International Confrence Engineering in Medicine and Biology Society (EMBC), Montreal, QC, Canada, 20-24 Jul. 2020; pp. 1-4.
14. Timmermans, A. A. A.; Seelen, H. A. M.; Geers, R. P. J.; Saini, P. K.; Winter, S.; te Vrugt, J.; Kingma, H. Sensor-based arm skill training in chronic stroke patients: Results on treatment outcome, patient motivation, stem usability. IEEE Trans. Neural. Sys. Rehabil. Eng. 2010, 18, 284-292.
15. Brutsch, K.; Koenig, A.; Zimmerli, L.; Merillat-Koeneke, S.; Riener, R.; Jancke, L.; van Hedel, H. J. A.; Meyer-Heim, A. Virtual reality for enhancement of robot-assisted gait training in children with neurological gait disorders. J. Rehabil. Med. 2011, 43, 493-499.
16. Prahm, C.; Kayali, F.; Vujaklija, I.; Sturma, A.; Aszmann, O. Increasing motivation, effort and performance through game-based rehabilitation for upper limb myoelectric prosthesis control. In Proceedings of the 2017 International Conference on Virtual Rehabilitation (ICVR), Montreal, QC, Canada, 19-22 Jun. 2017; pp. 1-6.
17. Warraich, Z.; Kleim, J. A. Neural plasticity: The biological substrate for neurorehabilitation. PM&R 2010, 2, S208-S219.
18. Sathiyanarayanan, M.; Azharuddin, S.; Kumar, S.; Khan, G. Gesture controlled robot for military Purpose. Int. J. Technol. Res. Eng. 2014, 1, 1300-1303.
19. Nemec, D.; Janota, A.; Gregor, M.; Hruboš, M.; Pirník, R. Control of the mobile robot by hand movement measured by inertial sensors. Electr. Eng. 2017, 99, 1161-1168.
20. Wolf, M. T.; Assad, C.; Vernacchia, M. T.; Fromm, J.; Jethani, H. L. Gesture-based robot control with variable autonomy from the JPL BioSleeve. In Proceedings of the 2013 IEEE International Conference on Robotics and Automation, Karlsruhe, Germany, 6-10 May 2013; pp. 1160-1165.
21. Wen, R.; Tay, W. L.; Nguyen, B. P.; Chng, C. B.; Chui, C. K. Hand gesture guided robot-assisted surgery based on a direct augmented reality interface. Comp. Meth. Prog. Biomed. 2014, 116, 68-80.
22. Yang, G.; Lv, H.; Chen, F.; Pang, Z.; Wang, J.; Yang, H.; Zhang, J. A novel gesture recognition system for intelligent interaction with a nursing-care assistant robot. Appl. Sci. 2018, 8, 2349.
23. Balasubramanian, S.; Colombo, R.; Sterpi, I.; Sanguineti, V.; Burdet, E. Robotic assessment of upper limb motor function after stroke. Am. J. Phys. Med. Rehabil. 2012, 91, S255-S269.
24. Standen, P. J.; Threapleton, K.; Connell, L.; Richardson, A.; Brown, D. J.; Battersby, S.; Sutton, C. J.; Platts, F. Patients' use of a home-based virtual reality system to provide rehabilitation of the upper limb following stroke. Phys. Ther. 2015, 95, 350-359.
25. Semprini, M.; Laffranchi, M.; Sanguineti, V.; Avanzino, L.; De Icco, R.; De Michieli, L.; Chiappalone, M. Technological approaches for neurorehabilitation: From robotic devices to brain stimulation and beyond. Front. Neurol. 2018, 9, 212.
26. Barlett, N. D.; Gentile, D. A.; Barlett, C. P.; Eisenmann, J. C.; Walsh, D. A. Sleep as a mediator of screen time effects on US children's health outcomes: A prospective study. J. Child. Media 2012, 6, 37-50.
27. Lissak, G. Adverse physiological and psychological effects of screen time on children and adolescents: Literature review and case study. Environ. Res. 2018, 164, 149-157.
28. Guadagnoli, M. A.; Lee, T. D. Challenge point: A framework for conceptualizing the effects of various practice conditions in motor learning. J. Mot. Behav. 2004, 36, 212-224.
29. Paulich, M.; Schepers, M.; Rudigkeit, N.; Bellusci, G. Xsens MTw Awinda: Miniature Wireless Inertial-Magnetic Motion Tracker for Highly Accurate 3D Kinematic Applications; Xsens: Enschede, The Netherlands, 2018; pp. 1-9.
30. Snoddy, G. S. Learning and stability: A psychophysiological analysis of a case of motor learning with clinical applications. J. App. Psyc. 1926, 10, 1.
31. Renewal Lodge.com. Available online: https://www.renewallodge.com/5-ways-quitting-drinking-affects-your-brain/(accessed on 21 Jun. 2020).
32. Brooke, J. SUS: A Quick and Dirty usability scale. Usability Eval. Ind. 1996, 189, 4-7.
33. Likert, R. A technique for the measurement of attitudes. Arch. Psychol. 1932, 140, 1-55.
34. Balasubramanian, S.; Melendez-Calderon, A.; Burdet, E. A robust and sensitive metric for quantifying movement smoothness. IEEE Trans. Biomed. Eng. 2012, 59, 2126-2136.
35. Flash, T.; Hogan, N. The coordination of arm movements: An experimentally confirmed mathematical model. J. Neurosci. 1985, 5, 1688-1703.
36. Rodgers, J. L.; Nicewander, W. A. Thirteen ways to look at the correlation coefficient. Am. Stat. 1988, 42, 59-66.
37. Taylor, R. Interpretation of the correlation coefficient: A basic review. J. Diagnos. Med. Sonogr. 1990, 6, 35-39.
38. Brooke, J. SUS: A Retrospective. J. Usability Stud. 2013, 8, 29-40.
39. Lewis, J. R.; Sauro, J. The factor structure of the System Usability Scale. In International Conference on Human Centered Design; Human Centered Design. HCD 2009. Lecture Notes in Computer Science; Kurosu, M.; Eds.; Springer: Berlin/Heidelberg, Germany, 2009; Volume 5619, pp. 94-103.
40. Borsci, S.; Federici, S.; Lauriola, M. On the dimensionality of the System Usability Scale: A test of alternative measurement models. Cog. Process. 2009, 10, 193-197.
41. Birkenmeier, R. L.; Prager, E. M.; Lang, C. E. Translating animal doses of task-specific training to people with chronic stroke in 1-hour therapy sessions: A proof-of-concept study. Neurorehabil. Neural Rep. 2010, 24, 620-635.
42. Colombo, R.; Pisano, F.; Micera, S.; Mazzone, A.; Delconte, C.; Carrozza, M. C.; Dario, P.; Minuco, G. Robotic techniques for upper limb evaluation and rehabilitation of stroke patients. IEEE Trans. Neural Sys. Rehabil. Eng. 2005, 13, 311-324.
43. Chen, Y.; Duff, M.; Lehrer, N.; Sundaram, H.; He, J.; Wolf, S. L.; Rikakis, T. A computational framework for quantitative evaluation of movement during rehabilitation. AIP Conf. Proc. Am. Inst. Phys 2011, 1371, 317-326.
44. Charles, S. K.; Hogan, N. The curvature and variability of wrist and arm movements. Exp. Brain Res. 2010, 203, 63-73.

45. Brewer, B. R.; McDowell, S. K.; Worthen-Chaudhari, L. C. Poststroke upper extremity rehabilitation: A review of robotic systems and clinical results. Top. Stroke Rehabil. 2007, 14, 22-44.

46. Wulf, G. Self-controlled practice enhances motor learning: Implications for physiotherapy. Physiotherapy 2007, 93, 96-101.

47. Snodgrass, S. J.; Rivett, D. A.; Robertson, V. J.; Stojanovski, E. Real-time feedback improves accuracy of manually applied forces during cervical spine mobilisation. Man. Ther. 2010, 15, 19-25.

48. McLaughlin, A.; Gandy, M.; Allaire, J.; Whitlock, L. Putting fun into video games for older adults. Ergon. Des. 2012, 20, 13-22.

49. Feys, H. M.; De Weerdt, W. J.; Selz, B. E.; Cox Steck, G. A.; Spichiger, R.; Vereeck, L. E.; Putman, K. D.; Van Hoydonck, G. A. Effect of a therapeutic intervention for the hemiplegic upper limb in the acute phase after stroke: A single-blind, randomized, controlled multicenter trial. Stroke 1998, 29, 785-792.

50. Wu, C. Y.; Chen, C. l.; Tang, S. F.; Lin, K. C.; Huang, Y. Y. Kinematic and clinical analyses of upper-extremity movements after constraint-induced movement therapy in patients with stroke: A randomized controlled trial. Arch. Phys. Med. Rehabil. 2007, 88, 964-970.

51. Sigrist, R.; Rauter, G.; Riener, R.; Wolf, P. Augmented visual, auditory, haptic, and multimodal feedback in motor learning: A review. Psychon. Bull. Rev. 2013, 20, 21-53.

52. Patel, K.; Bailenson, J. N.; Hack-Jung, S.; Diankov, R.; Bajcsy, R. The effects of fully immersive virtual reality on the learning of physical tasks. In Proceedings of the 9th Annual International Workshop on Presence, Cleveland, Ohio, USA, 24-26 Aug. 2006; pp. 87-94.

53. Manwell, Laurie A., et al. "Digital dementia in the internet generation: excessive screen time during brain development will increase the risk of Alzheimer's disease and related dementias in adulthood." Journal of Integrative Neuroscience 21.1 (2022): 28.

54. Neophytou, Eliana, Laurie A. Manwell, and Roelof Eikelboom. "Effects of excessive screen time on neurodevelopment, learning, memory, mental health, and neurodegeneration: A scoping review." International Journal of Mental Health and Addiction 19.3 (2021): 724-744.

55. Shaw, Lindsay Alexander, et al. "Challenges in virtual reality exergame design." (2015).

56. Sheppard, Amy L., and James S. Wolffsohn. "Digital eye strain: prevalence, measurement and amelioration." BMJ open ophthalmology 3.1 (2018): e000146.

57. Umejima, Keita, et al. "Paper notebooks vs. mobile devices: brain activation differences during memory retrieval." Frontiers in Behavioral Neuroscience (2021): 34.

58. Koch, Andreas, et al. "The neurophysiology and treatment of motion sickness." Deutsches Ärzteblatt International 115.41 (2018): 687.

59. Schmäl, Frank. "Neuronal mechanisms and the treatment of motion sickness." Pharmacology 91.3-4 (2013): 229-241.

60. Zhang, Li-Li, et al. "Motion sickness: current knowledge and recent advance." CNS neuroscience & therapeutics 22.1 (2016): 15-24.

61. Segal, A. D. et al, Sensors, 2020. 20(4269): 1-18

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

We claim:

1. A device comprising:

a microcontroller;

an electronic transceiver;

a movement detector in communication with the microcontroller via the electronic transceiver; and a robot, wherein the movement detector is configured to detect user motion and control the robot based on the motion, wherein the device is configured to be used for rehabilitation or diagnosis of a motor condition of the user, wherein the movement detector comprises at least one inertial measurement unit configured to assess the motor condition of the user.

2. The device of claim 1, wherein the movement detector comprises a wearable device.

3. The device of claim 1, wherein the movement detector is coupled to an intervention device.

4. The device of claim 3, wherein intervention device comprises a wobble board, the wobble board configured to receive the feet of the user thereupon and receive the motion based on a balance of the user.

5. The device of claim 1, wherein the robot comprises at least one of a tele-operated vehicle or an at least partially autonomous vehicle.

6. The device of claim 5, further comprising a course configured to receive the vehicle, wherein the control of the vehicle is configured to guide the vehicle through the course.

7. A method of providing a rehabilitation or diagnosis for a user intervention, comprising:

obtaining a motion sensing device configured for manipulation by the user, wherein the motion sensing device is configured to assess a motor condition of the user;

creating, via one or more processing elements, a communication link between the motion sensing device and a robot; and detecting, via the motion sensing device, a movement initiated by the user;

creating, via the one or more processing elements, a signal within the sensing device;

transmitting, via the one or more processing elements, the signal to the robot;

moving the robot based on the signal.

8. The method of claim 7, wherein the motion sensing device comprises a wearable device.

9. The method of claim 7, wherein the motion sensing device is coupled to an intervention device.

10. The method of claim 9, wherein the intervention device comprises a wobble board, the wobble board configured to receive the feet of the user thereupon and receive the motion based on a balance of the user.

11. The method of claim 7, wherein the robot comprises at least one of a tele-operated vehicle or an at least partially autonomous vehicle.

12. The method of claim 7, wherein the motion of the vehicle is configured to guide the vehicle through a course.

13. The method of claim 7, further comprising:

generating, via the motion sensing device, a signal operative to control the robot based on a user motion;

moving the robot in response to receiving the signal;

generates a visual feedback signal based on the motion of the robot; and generating an updated signal, via the motion sensing device, based on an updated user motion and the visual feedback signal.

14. A system;

a motion sensing device;

a robot; and a central processing unit in electronic communication with at least one of the motion sensing device or the robot, wherein the system is configured to be used for rehabilitation or diagnosis of a motor condition of a user, wherein the movement detector comprises at least one inertial measurement unit configured to assess the motor condition of the user.

15. The system of claim 14, wherein:

the system comprises a closed loop control system;

the motion sensing device generates a signal operative to control the robot based on a user motion;

the robot moves in response to receiving the signal; and the motion of the robot generates a visual feedback signal;

the motion sensing device generates an updated signal based on an updated user motion, the updated user motion based on the visual feedback signal.

16. The system of claim 14, wherein the motion sensing device comprises a wearable device.

17. The system of claim 14, wherein the motion sensing device is coupled to an intervention device.

18. The system of claim 17, wherein the intervention device comprises a wobble board, the wobble board configured to receive the feet of the user thereupon and receive the motion based on balance of the user.

19. The system of claim 14, wherein the robot comprises at least one of a tele-operated vehicle or an at least partially autonomous vehicle.

20. The system of claim 14, further comprising a course configured to receive the vehicle, wherein motion sensing device detects a user input and generates a signal configured to control of the vehicle to guide the vehicle through the course.

* * * * *